(12) United States Patent
Amar et al.

(10) Patent No.: US 12,521,421 B2
(45) Date of Patent: Jan. 13, 2026

(54) **USE OF *AKKERMANSIA* IN THE TREATMENT OF ORAL DISEASES**

(71) Applicant: NEW YORK MEDICAL COLLEGE, Valhalla, NY (US)

(72) Inventors: Salomon Amar, Teaneck, NJ (US); Willem M. deVos, Amsterdam (NL)

(73) Assignee: NEW YORK MEDICAL COLLEGE, Valhalla, NY (US)

( * ) Notice: Subject to any disclaimer, the term of this patent is extended or adjusted under 35 U.S.C. 154(b) by 0 days.

(21) Appl. No.: 18/581,838

(22) Filed: Feb. 20, 2024

(65) Prior Publication Data
US 2024/0293475 A1    Sep. 5, 2024

Related U.S. Application Data

(63) Continuation of application No. 16/724,672, filed on Dec. 23, 2019, now abandoned.

(30) Foreign Application Priority Data

Dec. 21, 2018 (EP) ..................... 18215715

(51) Int. Cl.
*A61K 35/74* (2015.01)
*A61K 9/00* (2006.01)

(52) U.S. Cl.
CPC ............ *A61K 35/74* (2013.01); *A61K 9/0014* (2013.01); *A61K 9/0053* (2013.01)

(58) Field of Classification Search
None
See application file for complete search history.

(56) References Cited

U.S. PATENT DOCUMENTS

2015/0306152 A1    10/2015   Cani et al.

FOREIGN PATENT DOCUMENTS

| WO | 2014076246 A1 | 5/2014 |
| WO | 2015188178 A1 | 12/2015 |
| WO | 2017148496 A1 | 9/2017 |

OTHER PUBLICATIONS

Mark Welch, Jessica L., et al., "Biogeography of a human oral microbiome at the micron scale," Proceedings of the National Academy of Sciences, Feb. 2016, pp. E791-E800, 113.6.
Dewhirst, Floyd E., et al., "The human oral microbiome," Journal of bacteriology, Oct. 2010, pp. 5002-2017, 192.19.
Ouwerkerk, Janneke P., et al. "*Akkermansia glycaniphila* sp. nov., an anaerobic mucin-degrading bacterium isolated from reticulated python faeces," International journal of systematic and evolutionary microbiology, Nov. 2016, pp. 4614-4620, 66.11.
Van Passel, Mark WJ, et al., "The genome of Akkermansia muciniphila, a dedicated intestinal mucin degrader, and its use in exploring intestinal metagenomes," PloS one, Mar. 2011, pp. e16876-e16876, 6.3.
Derrien, Muriel, et al., "*Akkermansia muciniphila* gen. nov., sp. nov., a human intestinal mucin-degrading bacterium," International journal of systematic and evolutionary microbiology, Sep. 2004, pp. 1469-1476, 54.5.
Kinane, Denis F., et al., "Periodontal diseases," Nature reviews Disease primers, Jun. 2017, pp. 1-14, 3.1.
Altschul, Stephen F., et al,. "Basic local alignment search tool," J Mol Biol, Oct. 1990, pp. 403-410, 215.3.
Kim, Mincheol, et al., "Towards a taxonomic coherence between average nucleotide identity and 16S rRNA gene sequence similarity for species demarcation of prokaryotes," International journal of systematic and evolutionary microbiology, Feb. 2014, pp. 346-351, 64. Pt 2.
Carrillo, Humberto, et al., "The multiple sequence alignment problem in biology," SIAM journal on applied mathematics, Oct. 1988, pp. 1073-1082, 48.5.
Devereux, John, et al., "A comprehensive set of sequence analysis programs for the VAX," Nucleic acids research, Jan. 1984, pp. 387-395, 12.1Part1.
Chelakkot, Chaithana, et al. "Akkermansia muciniphila-derived extracellular vesicles influence gut permeability through the regulation of tight junctions," Experimental & molecular medicine, Feb. 2018, pp. e450-e450, 50.2.
Meier-Kolthoff, Jan P., et al. "Genome sequence-based species delimitation with confidence intervals and improved distance functions," BMC bioinformatics, Dec. 2013, pp. 1-14, 14.1.
Plovier, Hubert et al., "A purified membrane protein from Akkermansia muciniphila or the pasteurized bacterium improves metabolism in obese and diabetic mice", Nature Medicine, vol. 23, No. 1, Jan. 1, 2017, pp. 107-113.
Ottman, Noora et al., "Action and function of Akkermansia muciniphila in microbiome ecology, health and disease", Best Practice and Research, Clinical gastroenterology, vol. 31, No. 6, Dec. 1, 2017, pp. 637-642.
European Office Action dated Jun. 1, 2021 issued by the EPO in corresponding Application No. 18215715.6, 3 pages.
European Search Report and Opinion dated Jun. 11, 2019 issued by the EPO in corresponding Application No. 18215715.6, 7 pages.
Cani, Patrice D., et al., "Next-Generation Beneficial Microbes: The Case of Akkermansia muciniphila", Frontiers in Microbiology, vol. 8, Sep. 22, 2017, 8 pages.
Ottman, Noora, et al., "Pili-like proteins of Akkermansia muciniphila modulate host immune responses and gut barrier function," PloS one, Mar. 2017, e0173004, 12.3.

*Primary Examiner* — Brian Gangle
(74) *Attorney, Agent, or Firm* — George Likourezos; Carter, DeLuca & Farrell LLP

(57) ABSTRACT

The present invention relates to the use of *Akkermansia* and/or fragments thereof in the treatment and/or prevention of oral diseases. In particular, the present invention relates to *Akkermansia muciniphila* and/or fragments thereof, such as proteins and secreted molecules, for use in treating and/or preventing oral diseases.

10 Claims, 11 Drawing Sheets
Specification includes a Sequence Listing.

A

B

USE OF *AKKERMANSIA* IN THE TREATMENT OF ORAL DISEASES

This application is a continuation application of U.S. Ser. No. 16/724,672 filed on Dec. 23, 2019 which claims priority to EP 18215715.6 filed on Dec. 21, 2018

REFERENCE TO ELECTRONIC SEQUENCE LISTING

The application contains a Sequence Listing which has been submitted electronically in .XML format and is hereby incorporated by reference in its entirety. Said .XML copy, created on May 17, 2024, is named "2686-12 CON TK1.xml" and is 4,092 bytes in size. The sequence listing contained in this .XML file is part of the specification and is hereby incorporated by reference herein in its entirety.

FIELD OF INVENTION

The present invention relates to the treatment of oral diseases. More specifically, the present invention relates to the use of *Akkermansia* spp. and/or fragments thereof for treating oral diseases.

BACKGROUND OF INVENTION

Several oral diseases, in particular gingivitis and periodontitis, are caused by bacteria in the dental plaque, the biofilm that grows on surfaces within the mouth. The buildup of plaque is associated with the subsequent inflammation of the gum tissues, that, swollen, detach form the tooth and thereby further promotes bacterial growth inside these newly formed bacterial pockets. Left untreated, periodontitis may destroy the periodontal ligament and the supporting alveolar bone, eventually leading to tooth loss. Despite its prevalence, 538 million people were estimated to be affected in 2015, current therapeutic approaches have left periodontitis as the major cause of tooth loss (Kinane et al., Nat Rev Dis Primers. 2017 Jun. 22; 3:17038). The main treatments available for periodontitis are based on prevention measures such as teeth brushing and flossing and, in advanced cases, surgery to stop the progression of the irreversible damages. Antibiotics are also used, with all the undesirable side effects associated with their use, notably the deleterious perturbation of the host microbiota. There is thus a need for the provision of new therapies for the treatment and/or prevention of periodontitis.

The oral microbiome is complex and published records include over 600 taxa (Dewhirst et al. Journal of Bacteriology, 2010, 192 (19): 5002-5017) while the website eHOMD described the most actual description including 777 different species. Most of these (over 96%) belong to six major phyla, Firmicutes, Bacte-roidetes, Proteobacteria, Actinobacteria, Spirochaetes, and Fusobacteria. The remaining phyla include Euryarchaeota, Chlamydia, Chloroflexi, SRI, Synergistetes, Tenericutes, and TM7. Some of these taxa are known as pathogens, such as *Candida albicans, Streptococcus mutans, Streptococcus gordonii, Streptococcus oxalis, Streptococcus sanguis, Treponema denticola, Aggregatibacter actinomycetemcomi-tans* and/or *Porphyromonas gingivalis*. Most of these form polymicrobial biofilms that are characteristic of the oral cavity (Welch et al. PNAS, 2016, 113 (6): E791-E800).

The modulation of the composition of the microbiota, has emerged as a promising therapeutic strategy for the management of diseases involving an interface between the patient and a diverse microbial population. This interest has until now been mainly focused on the intestinal microbiota. Among the bacterial species of interest, bacteria of the genus *Akkermansia, Akkermansia muciniphila* in particular, have been inversely associated with metabolic diseases (WO2014076246). *A. muciniphila*, a mucophilic symbiont found in colon of healthy lean individuals, uses mucin as its primary carbon and energy source allowing it to survive in the gut during times of low nutrient availability {Derrien: 2004ij}. It is the only representative bacteria of its genus in the human microbiome and makes up about 3 to 5% of the total bacteria present {Plovier: 2017dp}. *A. muciniphila* adhesion to the epithelium of the colon has been shown to promote the integrity of the intestinal barrier in human cells and diet-induced obese animal models {Everard: 2013fx, Reunanen: 2015cj}. It has been observed that some of the beneficial effects associated the administration of *A. muciniphila* are recapitulated using extracellular vesicles secreted by *A. muciniphila* or using Amuc_1100, a membrane protein from *A. muciniphila* (Ottman et al., PLOS One. 2017 Mar. 1; 12 (3): e01 73004; {Chelakkot: 2018jv} {Plovier: 2017dp}). While *A. muciniphila* function in the intestine has been extensively studied, its potential role in the oral cavity was unknown.

Here it is described that the administration of *A. muciniphila* is able to reduce tissue inflammation and bone destruction induced by the pathogenic microorganisms, to modulate the host immune response to infection and to reinforce the integrity of the gingival epithelial barrier. These unexpected observations open the way to the use of *Akkermansia* for treating oral diseases.

SUMMARY

The present invention relates to *Akkermansia* and/or fragments thereof for use in the treatment of oral diseases.

In one embodiment, said oral diseases are selected from the group comprising or consisting of periodontitis, gingivitis, peri-implant mucositis, peri-implantitis, oral thrush, dental caries and black hairy tongue.

The present invention also relates to *Akkermansia* and/or fragments thereof for preventing and/or improving bad breath in a subject in need thereof.

In one embodiment, said *Akkermansia* is selected from the group comprising or consisting of *Akkermansia muciniphila, Akkermansia glycaniphilus* and variants thereof.

In one embodiment, said *Akkermansia* is alive. In another embodiment, said *Akkermansia* is pasteurized.

In one embodiment, said fragments are selected from the group comprising or consisting of the protein Amuc_1 100 and Akk:ermansia-derived extracellular vesicles.

In one embodiment, said *Akkermansia* and/or fragments thereof is orally administered. In one embodiment, oral administration comprises oral administration and topical administration.

The present invention also relates to a composition comprising, consisting of, or consisting essentially of, *Akkermansia* and/or fragments thereof in association with an excipient.

The present invention further relates to a pharmaceutical composition comprising, consisting of, or consisting essentially of, *Akkermansia* and/or fragments thereof and at least one pharmaceutically acceptable excipient, for use in the treatment of oral diseases.

Another object of the present invention is a medicament comprising, consisting of, or consisting essentially of, *Akkermansia* and/or fragments thereof for use in the treatment of oral diseases.

The present invention also relates to a medical device comprising, consisting of, or consisting essentially of *Akkermansia* and/or fragments thereof for treating oral diseases.

The present invention further relates to the use of *Akkermansia* and/or fragments thereof for preventing and/or improving bad breath in a subject in need thereof.

Another object of the present invention is a cosmetic composition comprising, consisting of, or consisting essentially of *Akkermansia* and/or fragments thereof for preventing and/or improving bad breath.

As used herein, the term "consisting essentially of", with reference to a composition or a medicament, means that *Akkermansia* and/or fragments thereof is the only one agent with a biologic activity within said composition or medicament.

Definitions

In the present invention, the following terms have the following meanings:

As used herein, the term "*Akkermansia*" refers to at least one bacterium belonging to the genus *Akkermansia*, itself belonging to the Verrucomicrobia bacterial phylum. *Akkermansia* are part of the intestinal microbiota of several animal species. The genus comprises but is not limited to, two species, *Akkermansia muciniphila*, the type species described by Derrien et al. (2004. Int. J. Syst. Evol. Microbial. 54:1469-1476) and *Akkermansia glycaniphilus* described in international patent application WO2017148496 and in Ouwerkerk et al. (2016. Int. J. Syst. Evol. Microbial. 66 (11): 4614-4620). The type strain of *Akkermansia muciniphila* is *Akkermansia muciniphila* MucT, initially isolated from the gut microbiota of a healthy human subject. The type strain of *Akkermansia glycaniphilus* is *Akkermansia glycaniphilus* PytT, initially isolated from a fresh feces sample form the reticulated python (*Malayopython reticulatus*). Both species are able to colonize the intestinal tract of several animal species. *Akkermansia* are gram-negative, non-mobile, anaerobic, oval-shaped, non-spore forming bacteria capable of using mucin as their sole carbon and nitrogen source. The term also encompasses variants of the species or strains belonging to the genus *Akkermansia*.

As used herein, term "identity" when used in a relationship between the sequences of two or more polypeptides or of two or more nucleic acid molecules, refers to the degree of sequence relatedness between polypeptides or nucleic acid molecules, as determined by the number of matches between strings of two or more amino acid or nucleotide residues. "Identity" measures the percent of identical matches between the smaller of two or more sequences with gap alignments (if any) addressed by a particular mathematical model or computer program (i.e., "algorithms"). Identity of related polypeptides can be readily calculated by known methods. Such methods include, but are not limited to, those described in Computational Molecular Biology, Lesk, A. M., ed., Oxford University Press, New York, 1988; Biocomputing: Informatics and Genome Projects, Smith, D. W., cd., Academic Press, New York, 1993; Computer Analysis of Sequence Data, Part 1, Griffin, A. M., and Griffin, H. G., eds., Humana Press, New Jersey, 1994; Sequence Analysis in Molecular Biology, von Heinje, G., Academic Press, 1987; Sequence Analysis Primer, Gribskov, M. and Devereux, J., eds., M. Stockton Press, New York, 1991; and Carillo et al., SIAM J. Applied Math. 48, 1073 (1988). Preferred methods for determining identity are designed to give the largest match between the sequences tested. Methods of determining identity are described in publicly available computer programs.

Preferred computer program methods for determining identity between two sequences include the GCG program package, including GAP (Devereux et al., Nucl. Acid. Res. \2, 387 (1984); Genetics Computer Group, University of Wisconsin, Madison, Wis.), BLASTP, BLASTN, and PASTA (Altschul et al., J. Mol. Biol. 215, 403-410 (1990)). The BLASTX program is publicly available from the National Center for Biotechnology Information (NCBI) and other sources (BLAST Manual, Altschul et al. NCB/NLM/NIH Bethesda, Md. 20894; Altschul et al., supra). The well-known Smith Waterman algorithm may also be used to determine identity.

As used herein, the term "protein variant" is a polynucleotide that typically differs from a protein specifically disclosed herein in one or more substitutions, deletions, additions and/or insertions. Such variants may be naturally occurring or may be synthetically generated, for example, by modifying one or more of the protein sequences of the invention and evaluating one or more biological activities of the encoded protein as described herein and/or using any of a number of techniques well known in the art. Modifications may be made in the structure of the polynucleotides and proteins of the present invention and still obtain a functional molecule that encodes a variant or derivative protein with desirable characteristics. When it is desired to alter the amino acid sequence of a protein to create an equivalent, or even an improved, variant or portion of a protein of the invention, one skilled in the art will typically change one or more of the codons of the encoding DNA sequence. For example, certain amino acids may be substituted for other amino acids in a protein structure without appreciable loss of its ability to bind other polypeptides or cells. It is contemplated that various changes may be made in the protein sequences of the present invention, or corresponding DNA sequences that encode said proteins without appreciable loss of their biological utility or activity. In many instances, a protein variant will contain one or more conservative substitutions. A variant may also, or alternatively, contain nonconservative changes. In a preferred embodiment, variant proteins differ from a native sequence by substitution, deletion or addition of five amino acids or fewer.

As used herein, the term "oral diseases" refers to a group of diseases affecting oral tissues, such as oral bones, teeth, gums and the like. Example of oral diseases include but are not limited to, gingivitis (including but not limited to, classic gingivitis, pregnancy gingivitis and necrotizing ulcerative gingivitis), peri-implant mucositis, periodontitis (including but not limited to chronic periodontitis, aggressive periodontitis, systemic periodontitis and syndromic chronic periodontitis), peri-implantitis, oral squamous cell carcinoma, oral thrush, dental caries and black hairy tongue.

As used herein, the term "oral microbiota", refer to the complex community of microorganisms that live in the mouth of humans and other animals. The composition of the oral microbiota changes over the lifetime of the host organism or when the diet of the host changes. In one embodiment, the oral microbiota includes Firmicutes, Bacteroidetes, Proteobacteria, Actinobacteria, Spirochaetes, and Fusobacteria. In one embodiment, the oral microbiota includes Firmicutes, Bacteroidetes, Proteobacteria, Actinobacteria, Spirochaetes, Fusobacteria, Euryarchaeota, Chlamydia, Chloroflexi, SRI, Synergistetes, Tenericutes, and TM7.

As used herein, the term "Pharmaceutically acceptable carrier or excipient" refers to molecular entities and compositions that do not produce an adverse, allergic or other untoward reaction when administered to a subject, especially a human, as appropriate. It includes any and all solvents, dispersion media, coatings, antibacterial and antifungal agents, isotonic and absorption delaying agents and the like. For human administration, preparations should meet, sterility (in embodiments not comprising the use of viable bacterial cells), pyrogenicity, general safety and purity standards as required by regulatory offices, such as, for example, FDA Office or EMA. A pharmaceutically acceptable carrier or excipient may thus refer to a non-toxic solid, semi-solid or liquid filler, diluent, encapsulating material or formulation auxiliary of any type.

As used herein, the term "prebiotic" refers to a substance, which may not be digested by a subject (such as, for example, by humans), but which modulates composition and/or activity of the microbiota, such as for example, the oral microbiota through its metabolization by microorganisms in the mouth, thus conferring a beneficial physiological effect on the host.

As used herein, the term "probiotics" refers to microbial cell preparations (such as, for example, living microbial cells) which, when administered in an effective amount, provide a beneficial effect on the health or well-being of a subject. By definition, all probiotics have a proven non-pathogenic character. In one embodiment, these health benefits are associated with improving the balance of human or animal microbiota, and/or for restoring a normal microbiota.

As used herein, the term "subject" refers to a warm-blooded animal, preferably a human, a pet or livestock. In some embodiments, the subject may be a "patient", i.e., a subject who/which is awaiting the receipt of or is receiving medical care or was/is/will be the object of a medical procedure according to the methods of the present invention or is monitored for the development of a disease. As used herein, the terms "pet" and "livestock" include, but are not limited to, dogs, cats, guinea pigs, rabbits, pigs, cattle, sheep, goats, horses and poultry. In some embodiments, the subject is a male or female subject. In some embodiments, the subject is an adult or a child. the term "Substantially healthy subject" is used to define a subject which is not affected by the disease to be treated or by the discomfort to be alleviated. For example, if the Akkermansia of the invention or a fragment thereof is used for treating an oral disease, the substantially healthy subject is not affected by said oral disease. Preferably, the substantially healthy subject shares common characteristics with the subject to be treated, such as, for example, same gender, age, sex, diet, drugs intake or geolocation.

As used herein, the term "therapeutically effective amount" refers to the level or amount of an agent that is aimed at, without causing significant negative or adverse side effects to the target, (1) delaying or preventing the onset of a disease, disorder, or condition; (2) slowing down or stopping the progression, aggravation, or deterioration of one or more symptoms of the disease, disorder, or condition; (3) bringing about ameliorations of the symptoms of the disease, disorder, or condition; (4) reducing the severity or incidence of the disease, disorder, or condition; or (5) curing the disease, disorder, or condition. A therapeutically effective amount may be administered prior to the onset of the disease, disorder, or condition, for a prophylactic or preventive action. Alternatively, or additionally, the therapeutically effective amount may be administered after initiation of the disease, disorder, or condition, for a therapeutic action. In the context of the present invention the disease, disorder, or condition may be for example an oral disease.

As used herein, the term "treatment" refers to both therapeutic treatment and prophylactic or preventative measures wherein the object is to prevent or slow down (lessen) the targeted pathologic condition or disorder, such as for example, in the context of the present invention, an oral disease. Those in need of treatment include those already with the disorder as well as those prone to have the disorder or those in whom the disorder is to be prevented. A subject or mammal is successfully "treated" if, after receiving a therapeutic amount of Akkermansia and/or fragments thereof according to the present invention the patient shows one or more of the following observable and/or measurable changes: amelioration related to one or more of the symptoms associated with the specific disease or condition, reduction of morbidity and mortality and improvement in quality of life issues. The above parameters for assessing successful treatment and improvement in the disease are readily measurable by routine procedures familiar to a physician.

As used herein, the term "type strain" refers to as defined in the International Code of Nomenclature of Bacteria, as the nomenclatural type of the species and the reference point to which all other strains are compared to know whether they belong to that species.

DETAILED DESCRIPTION

The present invention relates to Akkermansia and/or fragments thereof for use in the treatment of oral diseases.

In one embodiment, the Akkermansia of the invention is selected from the group comprising, or consisting of, Akkermansia muciniphila and Akkermansia glycaniphilus.

In one embodiment, the Akkermansia of the invention is Akkermansia muciniphila. In a particular embodiment, the Akkermansia of the invention is Akkermansia muciniphila MucT_

In another embodiment, the Akkermansia of the invention is Akkermandia glycaniphilus. In a particular embodiment, the Akkermansia of the invention is Akkermansia glycaniphilus PytT_

As used herein, the term "Akkermansia" encompasses "variant" and "mutants" of Akkermansia.

Accordingly, in one embodiment, the Akkermansia of the invention is a variant of the genus, species and strains as described hereinabove. Said variant may also be referred as a derived strain. In one embodiment, the variant of the invention may be obtained by mutation, variation or recombination of the Akkermansia species and strains described herein. In the present invention, a variant of a bacteria may also be referred to as a mutant of said bacterium.

As used herein, the term "variant" and "mutants" are used interchangeably to refer to all the genetically or phenotypically distinct strains of a species or of a genus that retain the species-defining or genus-defining characteristics. Hence, the term may also refer to to a strain belonging to a taxonomic group which has undergone at least one natural or induced (i.e. by mutagenesis or genetic engineering) change (s) in its genetic structure that does not interfere with the defining properties of said taxonomic group. The change in its genetic structure may be an insertion or deletion or substitution of one or several nucleotides in the genomic sequence. For example, an Akkermansia muciniphila mutant refers to an *Akkermansia muciniphila* strain which has undergone a change, natural or by techniques of genetic engineering, in its genetic structure that does not interfere with its belonging to the *Akkermansia muciniphila* species.

In one embodiment, the variant of the invention is a variant of the species *Akkermansia muciniphila*. In one embodiment, the variant of the invention is a variant of the strain *Akkermansia muciniphila* MucT_

In one embodiment, a variant of the *Akkermansia* of the invention has a genome at least about 70%, preferably at least about 80%, at least about 90%, at least about 91%, 92%, 93%, 94%, 95%, 96%, 97%, 98%, 99%, 99.5%, 99.8% or more identical to the genome of the bacteria from which it derives.

The complete genome of *Akkermansia muciniphila* has been determined by van Passel et al. (2011. *PLOS One*. 6 (3): e16876). Similarly the complete genome of *A. glycaniphila* has been reported by Ouwerkerk et al. (2016. Int. J. Syst. Evol. Microbial. 66 (11): 4614-4620).

The sequence of the 16S rRNA gene is often used to identify different bacterial species because of the mutation accumulating in its hyper-variable regions and the presence of the gene in all bacteria. Therefore, in one embodiment, a variant of *Akkermansia* of the invention has a 16S rRNA gene sequence having at least about 90% identity with the 16S rRNA gene of the bacterium from which it derives, preferably at least about 91%, 92%, 93%, 94%, 95%, 96%, 96.5%, 97%, 97.5%, 97.6%, 97.7%, 97.8%, 97.9%, 98.0%, 98.1%, 98.2%, 98.3%, 98.4%, 98.5%, 98.6%, 98.65%, 98.7%, 98.8%, 98.9%, 99%, 99.1%, 99.2%, 99.3%, 99.4%, 99.5%, or more, identical to the sequence of the 16S rRNA gene of the bacteria from which it derives.

In one embodiment, a variant of the *Akkermansia* of the invention has a hybrid DNA-DNA hybridization value (also referred to as DDH value) above about 60%, preferably above about 61%, 62%, 63%, 64%, 65%, 66%, 67%, 68%, 69%, more preferably above about 70% when using as a reference the *Akkermansia* of the invention.

As used herein, the term "hybrid DNA-DNA hybridization value" or "DDH value" refers to a measure of genomic similarity between two organisms. Techniques to determine a DDH value are known to the person skilled in the art (such as, for example, methods reviewed by Rossello-Mora, in Stackebrandt et al., Molecular Identification, Systematics, and Population Structure of Prokaryotes, p23-50, 2006, Springer, Berlin, Heidelberg) and rely on the following general principle: (i) shearing the genomic DNA (gDNA) of the assayed organism and the gDNA of the reference organism(s) (for instance in the context of the present invention *Akkermansia muciniphila*) into small fragments of 600-800 bp; (ii) heating the mixture of DNA fragments from both strains to dissociate the DNA double-strands; and (iii) subsequently decreasing the temperature until the fragments reanneal. For the reason that the melting temperature of a double-strand depends on the degree of matching base pairings between both strands, genomic (dis-)similarity can be inferred from the melting temperature. The hybrid DDH value is usually specified relative to the DDH value obtained by hybridizing a reference genome with itself. DDH values:::; 70% may be considered as an indication that the tested organism belongs to a different species than the type strain used as reference. The DDH value may also evaluated on the basis of the genomic sequence of the strains to be compared, for example, using publicly available computer programs such as without limitation using the method described in Meier-Kolthoff et al. (BMC Bioinformatics. 2013 Feb. 21; 14:60). However, it should be noted that for a new species designation a polyphasic approach is used and next to molecular data also different biochemical and physiological characteristics are required.

In one embodiment, a variant of the *Akkermansia* of the invention has an Average Nucleotide Identity (ANI) value above about 60%, preferably above about 65%, 70%, 75%, 80%, 85%, 90%, more preferably above about 95%, even more preferably above about 96% when using as a reference the *Akkermansia* of the invention.

As used herein, the term "Average Nucleotide Identity" or "ANI" refers to a measure of genomic similarity between two organisms. Techniques to determine the ANI value are known to the person skilled in the art (such as, for example, methods implemented in Kim et al., Int J Syst Evol Microbial. 2014 February; 64 (Pt 2): 346-51). Briefly, ANI correspond to corresponds to the sum for each bidirectional best hit (BBH-orthologs sequences identified on the basis of their position in the genome and sequence identity) of the identity multiplied by the length of the alignment divided by the total length of BBH genes.

In one embodiment, fragments of the *Akkermansia* of the invention are used for treating oral diseases.

As used herein, the term "fragments" refers to a least one cellular component, metabolite, secreted molecule or vesicle and compound resulting from the metabolism of the *Akkermansia* of the invention and the like. Examples of cellular components include, but are not limited to, bacterial cell wall components such as peptidoglycan, bacterial nucleic acids such as DNA and RNA, bacterial membrane components, and bacterial structural components such as proteins, carbohydrates, lipids and combinations of these such as lipoproteins, glycolipids and glycoproteins, bacterial metabolites, organic acids, inorganic acids, bases, peptides, enzymes and co-enzymes, amino acids, carbohydrates, lipids, glycoproteins, lipoproteins, glycolipids, vitamins, bioactive compounds and metabolites containing an inorganic component. Fragments may be obtained by recovering the supernatant of a culture of the bacterium of the invention or by extracting cell components or cell fractions, metabolites or secreted compounds from a culture of the bacterium of the invention, a degradation product, a component in the isolated form, any mixture of one or more components derived from the bacterium of the invention, or one or more components present in the bacterium of the invention that are produced in another way, such as, for example, using recombinant DNA technology, in a microbial host or in any other (bio) synthetic process.

In one embodiment, fragments of the *Akkermansia* of the invention are selected from the group comprising or consisting of cellular components, proteins, peptides, secreted molecules, vesicles, extracellular vesicles, metabolites, extracellular compounds, and compounds resulting from the metabolism of the *Akkermansia* of the invention.

In one embodiment, fragments of the *Akkermansia* of the invention comprise or consist of the protein Amuc_1100. In one embodiment, a fragment of the *Akkermansia* of the invention is protein Amuc_1100 or fragments thereof.

As used herein, the term "Amuc_1 100" refers to a membrane protein purified from *Akkermansia muciniphila* described by Ottman et al. (PLOS One. 2017 Mar. 1;12 (3): e01 73004). In one embodiment, the protein Amuc_1 100 is also called AMT101. In one embodiment, the term also encompasses protein fragments and protein variants of the Amuc_1100 protein. In one embodiment, the term also encompasses proteins comprising the Amuc_1 110 amino acid sequence, variants and/or fragments thereof.

In one embodiment, the amino-acid sequence of the Amuc_1 100 protein of the invention comprises or consists of the sequence SEQ ID NO: 1, or a variant thereof.

SEQ ID NO: 1
IVNSKRSELDKKISIAAKEIKSANAAEITPSRSSNEELEKELNRYAKAV

GSLETAYKPFLASSALVPTTPTAFQNELKTFRDSLISSCKKKNILITDT

SSWLGFQVYSTQAPSVQAASTLGFELKAINSLVNKLAECGLSKFIKVYR

PQLPIETPANNPEESDEADQAPWTPMPLEIAFQGDRESVLKAMNAITGM

QDYLFTVNSIRIRNERMMPPPIANPAAAKPAAAQPATGAASLTPADEAA

APAAPAIQQVIKPYMGKEQVFVQVSLNLVHFNQPKAQEPSE

In one embodiment, the amino acid sequence of the Amuc_1 100 protein of the invention comprises or consists of an amino acid sequence presenting a sequence identity of at least 70%, preferably a sequence identity of at least about 75%, 80%, 85%, 90%, 91%, 92%, 93%, 94%, 95%, 96%, 97%, 98%, 99% or more, with an amino acid sequence SEQ ID NO: 1 and fragments thereof.

In one embodiment, the amino acid sequence of the Amuc_1 100 protein of the invention comprises or consists of a fragment of SEQ ID NO: 1, or a variant thereof.

In one embodiment, the amino-acid sequence of the Amuc_1 100 protein of the invention comprises or consists of the sequence SEQ ID NO: 2, or a variant thereof.

SEQ ID NO: 2
MSNWITDNKPAAMVAGVGLLLFLGLSATGYIVNSKRSELDKKISIAAKE

IKSANAAEITPSRSSNEELEKELNRYAKAVGSLETAYKPFLASSALVPT

TPTAFQNELKTFRDSLISSCKKKNILITDTSSWLGFQVYSTQAPSVQAA

STLGFELKAINSLVNKLAECGLSKFIKVYRPQLPIETPANNPEESDEAD

QAPWTPMPLEIAFQGDRESVLKAMNAITGMQDYLFTVNSIRIRNERMMP

PPIANPAAAKPAAAQPATGAASLTPADEAAAPAAPAIQQVIKPYMGKEQ

VFVQVSLNLVHFNQPKAQEPSE

In one embodiment, the amino acid sequence of the Amuc_1 100 protein of the invention comprises or consists of an amino acid sequence presenting a sequence identity of at least 70%, preferably a sequence identity of at least about 75%, 80%, 85%, 90%, 91%, 92%, 93%, 94%, 95%, 96%, 97%, 98%, 99% or more, with an amino acid sequence SEQ ID NO: 2 and fragments thereof.

In one embodiment, the amino acid sequence of the Amuc_1 100 protein of the invention comprises or consists of a fragment of SEQ ID NO: 2, or a variant thereof.

In one embodiment, a fragment of the *Akkermansia* of the invention is an *Akkermansia*-derived extracellular vesicle.

As used herein, the term "extracellular vesicle" or "EV" refers to lipid bilayer-comprising structures secreted from bacteria. A variety of bacteria constitutively produce EVs. EVs may also be defined as spherical lipid bilayers with an average diameter of 20-200 nm. The term encompasses all the proteins, lipids, nucleic acids, lipopolysaccharides and other virulence factors associated with pathogenesis comprised in said EV. In the context of the present invention the term also encompasses in particular *A. muciniphila*-derived extracellular vesicles as described by Chelakk: ot et al. (Exp Mol Med. 2018 Feb. 23;50 (2): e450).

In one embodiment, fragments of the *Akkermansia* of the invention are selected from the group comprising or consisting of the protein Amuc_1 100, variants and/or fragments thereof, and *Akkermansia*-derived extracellular vesicle.

In one embodiment, the *Akkermansia* of the invention is a viable cell.

In one embodiment, the *Akkermansia* of the invention is a non-viable cell.

As used herein, the term "viable cell" refers to cells that are able to proliferate in opposition to "non-viable cell" that are not able to proliferate. Methods for measuring cell viability and proliferation are known to one skilled in the art. For example, cell viability and proliferation may be assessed by spreading a solution containing at least one bacterium of the invention across a petri dish and counting the number of colonies after a determined time of incubation in optimal growth conditions. Alternatively, cells may be grown in liquid medium, and proliferation may be measured by measuring optical density of the bacterial culture after a determined time of incubation in optimal growth conditions.

In one embodiment, the *Akkermansia* and/or fragments thereof is pasteurized of the invention.

In one embodiment, the pasteurized *Akkermansia* and/or fragments thereof of the invention was heated at a temperature ranging from about 50° C. to about 100° C., preferably from about 60° C. to about 95° C., more preferably from about 70° C. to about 90° C. In one embodiment, the pasteurized *Akkermansia* and/or fragments thereof of the invention was heated at a temperature of about 50, 51, 52, 53, 54, 55, 56, 57, 58 or 59° C. In another embodiment, the pasteurized *Akkermansia* and/or fragments thereof of the invention was heated at a temperature of about 60, 61, 62, 63, 64, 65, 66, 67, 68 or 69° C. In yet another embodiment the pasteurized *Akkermansia* and/or fragments thereof of the invention was heated at a temperature of about 70, 71, 72, 73, 74, 75, 76, 77, 78 or 79° C. In yet another embodiment, the pasteurized *Akkermansia* and/or fragments thereof of the invention was heated at a temperature of about 80, 81, 82, 83, 84, 85, 86, 87, 88 or 89° C. In yet another embodiment, the pasteurized *Akkermansia* and/or fragments thereof of the invention was heated at a temperature of about 90, 91, 92, 93, 94, 95, 96, 97, 98, 99° cor 100° C.

In one embodiment, the pasteurized *Akkermansia* and/or fragments thereof of the invention was not heated at a temperature superior to about 100° C. In a particular embodiment, the pasteurized *Akkermansia* and/or fragments thereof of the invention was not heated at an ultra-high temperature, such as for example at a temperature ranging from about 110° C. to about 140° C. In one embodiment, the pasteurized *Akkermansia* and/or fragments thereof of the invention was not heated at a temperature superior to about 90° C. Accordingly, in one embodiment of the invention, the pasteurized *Akkermansia* and/or fragments thereof of the invention was not sterilized. Sterilization is a treatment intended to destroy, kill or inactivate all life forms and other biological agents. This includes microorganisms and their spores as well as viruses and prions. Unlike sterilization, pasteurization is not intended to kill all microorganisms but is usually applied to food with the aim to reduce the number of viable pathogens.

In one embodiment, the pasteurized *Akkermansia* and/or fragments thereof of the invention was heated for at least about 10 minutes. In another embodiment, the pasteurized *Akkermansia* and/or fragments thereof of the invention was heated for at least about 15, 20, 25, 30, 35 or 45 minutes. In one embodiment, the pasteurized *Akkermansia* and/or fragments thereof of the invention was heated for a period from about 10 to about 45 minutes.

In one embodiment, the pasteurized *Akkermansia* and/or fragments thereof of the invention was not heated for a short time. In a particular embodiment, the pasteurized *Akkermansia* and/or fragments thereof of the invention was not heated for less than about 30 seconds, less than about 60 seconds, less than about 90 seconds or less than about 120 seconds. In a preferred embodiment, the pasteurized *Akkermansia* and/or fragments thereof of the invention was not heated for a time of less than about 1 minute, preferably for a time of less than about 5, 6, 7, 8, or 9 minutes.

In one embodiment, the pasteurized *Akkermansia* and/or fragments thereof of the invention was heated at a temperature ranging from about 50° C. to about 100° C. for at least about 10 minutes. In a particular embodiment, the pasteurized *Akkermansia* and/or fragments thereof of the invention was heated to about 60° C. for about 20 or about 30 minutes. In another particular embodiment the pasteurized *Akkermansia* and/or fragments thereof of the invention was heated to about 70° C. for about 20 or about 30 minutes. In another particular embodiment the pasteurized *Akkermansia* and/or fragments thereof of the invention was heated to about 80° C. for about 20 or about 30 minutes. In another particular embodiment, the pasteurized *Akkermansia* and/or fragments thereof of the invention was heated to about 90° C. for about 20 or about 30 minutes.

In a particular embodiment, the pasteurized *Akkermansia* and/or fragments thereof of the invention was not heated at a temperature superior to about 1 10° C. for about 1 to about 120 seconds. In another particular embodiment, the pasteurized *Akkermansia* and/or fragments thereof of the invention was not heated at a temperature superior to about 100° C. for about 1 to about 120 seconds. In another particular embodiment, the pasteurized *Akkermansia* and/or fragments thereof of the invention was not heated at a temperature superior to about 90° C. for about 1 to about 120 seconds.

In one embodiment, the *Akkermansia* and/or fragments thereof of the invention is treated with an ultra-high temperature (UHT) treatment.

In one embodiment, the *Akkermansia* and/or fragments thereof of the invention is flash pasteurized. In one embodiment, the bacterium is treated at a temperature ranging from about 71.5° C. to about 74° C. for a period of time ranging from about 15 to about 30 seconds.

In one embodiment, the *Akkermansia* and/or fragments thereof of the invention is frozen.

As used herein the term 'frozen', refers to bacteria that are cooled down at or below a temperature allowing a phase transition from liquid to solid in said bacteria. In one embodiment said temperature is about −5° C., −20° C., −70° C., −80° C. or −190° C.

In one embodiment, viable cells can be recovered from the frozen *Akkermansia* of the invention.

Methods to prepare frozen stocks of bacteria from which viable cells can be recovered are known to the person of the art. For example, bacteria may be grown in a suitable liquid culture medium to reach the desired cell density. The desired volume of bacteria preparation is diluted with a sterile glycerol solution for a final glycerol concentration comprised between 15% v/v to 50% v/v glycerol and transferred to a container able to sustain cold temperatures such as a cryogenic vial. The container is then cooled down to temperature at or below −70° C.

In one embodiment, the *Akkermansia* of the invention is isolated.

As used herein, the term isolated refers to the separation of a bacterial cell from a natural, mixed population of living microbes, as present in the environment, for example in the oral microbiota, the gut microbiota, water, soil, or skin. Isolated bacteria can be amplified on defined laboratory medium.

In one embodiment, *Akkermansia* and/or fragments thereof of the invention is substantially pure, i.e., at least about 50% of the cells of the bacterial population are *Akkermansia* of the invention cells. Preferably, at least about 60%, 70%, 80%, 85%, 90%, 91%, 92%, 93%, 94%, 95%, 96%, 97%, 98%, 99% or more of the bacterial cells of the invention are *Akkermansia* of the invention cells.

In one embodiment, the *Akkermansia* and/or fragments thereof is substantially purified. As used herein, the term "substantially purified" means that *Akkermansia* and/or fragments thereof is comprised in a sample wherein it represents at least about 50%, preferably at least about 60, 70, 80, 85, 90, 95, 99% or more of the bacterial strains or fragment thereof of said sample.

The present invention further relates to a bacterial population comprising bacteria belonging to the genus *Akkermansia*, as described herein.

In one embodiment, the bacterial population of the invention is substantially pure, i.e., at least about 50% of the cells of the bacterial population are *Akkermansia* of the invention cells. Preferably, at least about 60%, 70%, 80%, 85%, 90%, 91%, 92%, 93%, 94%, 95%, 96%, 97%, 98%, 99% or more of the bacterial cells of the invention are *Akkermansia* of the invention cells.

In one embodiment, the oral disease of the invention is selected from the list comprising or consisting of periodontal diseases, periodontitis, gingivitis, peri-implant mucositis, peri-implantitis, oral squamous cell carcinoma, oral thrush, dental caries and black hairy tongue.

As used herein, the term "periodontal diseases" include, but are not limited to, infections and inflammation of the structures arounds the teeth. In one embodiment, structures arounds the teeth comprise gums, periodontal ligament and alveolar bone (also named periodontal bone).

In one embodiment, the oral disease of the invention is a periodontal disease. In one embodiment, the oral disease of the invention is selected from the list comprising or consisting of periodontitis, gingivitis, peri-implant mucositis and peri-implantitis.

In one embodiment, the oral disease of the invention is periodontitis or gingivitis.

In one embodiment, the oral disease of the invention is periodontitis. In a particular embodiment, the oral disease of the invention is selected from the group comprising or consisting of chronic periodontitis, aggressive periodontitis, systemic periodontitis and syndromic chronic periodontitis. In a particular embodiment, the oral disease of the invention is periodontitis associated with diabetes, periodontitis associated with obesity, or periodontitis associated with cirrhosis. In one embodiment, the oral disease of the invention is a periodontal inflammation.

In one embodiment, the oral disease of the invention is gingivitis. In a particular embodiment, the oral disease of the invention is selected from the group comprising or consisting of classic gingivitis, pregnancy gingivitis and necrotizing ulcerative gingivitis.

In a particular embodiment, the oral disease of the invention is selected from the list comprising or consisting of chronic periodontitis, aggressive periodontitis, systemic periodontitis, syndromic chronic periodontitis, classic gingivitis, pregnancy gingivitis and necrotizing ulcerative gingivitis.

In one embodiment, the oral disease of the invention is related to a pathogenic microorganism.

As used herein the term "disease related to a pathogenic microorganism" refers to the diseases associated with the presence of said pathogenic microorganism with a frequency superior to the frequency found in substantially healthy subjects.

Example of pathogenic microorganism particularly relevant in the context of the present invention include, but is not limited to, *Porphyromonas gingivalis, Candida albicans, Streptococcus mutans, Streptococcus gordonii, Streptococcus oralis, Streptococcus sanguis, Treponema denticola, Aggregatibacter actinomycetemcomitans, Prevotella intermedia, Bacteroides forsythus, Campylobacter rectus, Eubacterium nodatum, Peptostreptococcus micros, Streptococcus intermedius* and/or *Treponema*.

In one embodiment, the oral disease of the invention is associated with or due to *Porphyromonas gingivalis*.

Example of diseases associated with or due to *Porphyromonas gingivalis* include, but are not limited to, oral squamous cell carcinoma, gingivitis (including, but not limited to, classic gingivitis, pregnancy gingivitis and necrotizing ulcerative gingivitis) and periodontitis (including but not limited to chronic periodontitis, aggressive periodontitis, systemic periodontitis and syndromic chronic periodontitis).

In one embodiment, the oral disease of the invention is gingivitis associated with or due to *Porphyromonas gingivalis*.

In one embodiment, the oral disease of the invention is periodontitis associated with or due to *Porphyromonas gingivalis*.

In one embodiment, the oral disease of the invention is due to a dysbiosis (also called dysbacteriosis) caused by an increased microbial challenge due to various factors associated with life-style or resulting from reduced host resistance due to microbial challenge. In one embodiment, the dysbiosis is dysbiosis of the dental plaque microbiome.

In one embodiment, the dysbiosis is defined by a bacterial number up to $10^5$ times larger in comparison with a healthy state. In a particular embodiment, the dysbiosis is defined by a bacterial number $10^2$, $10^3$, $10^4$ or $10^5$ times larger in comparison with a healthy state.

The present invention also relates to a composition comprising an effective amount of *Akkermansia* and/or fragments thereof in association with an excipient.

In one embodiment, the composition of the invention is for treating and/or preventing, or for use in treating and/or preventing, an oral disease in a subject in need thereof.

In one embodiment, the composition of the invention is for preventing and/or improving bad breath in a subject in need thereof.

In one embodiment of the invention, the composition of the invention comprises an amount of the *Akkermansia* of the invention ranging from about $1.10^2$ to about $1.10^{15}$ cfu/g of the composition, preferably from about $1.10^4$ to about $1.10^{12}$ cfu/g of the composition, more preferably from about $1.10^5$ to about $1.10^{10}$ cfu/g of the composition and even more preferably from about $1.10^6$ to about $5.10^9$ cfu/g of the composition.

As used herein, "cfu" stands for "colony forming unit".

In one embodiment of the invention, the composition of the invention comprises an amount of the *Akkermansia* of the invention of ranging from about $1.10^2$ to about $1.10^{15}$ cfu/ml of the composition, preferably from about $1.10^4$ to about $1.10^{12}$ cfu/mL of the composition, more preferably from about $1.10^5$ to about $1.10^{10}$ cfu/mL of the composition and even more preferably from about $1.10^6$ to about $5.10^9$ cfu/mL of the composition.

In one embodiment of the invention, the composition of the invention comprises an amount of the *Akkermansia* of the invention ranging from about $1.10^6$ to about $1.10^{10}$ cfu/g or cfu/mL of the composition, preferably from about $1.10^8$ to about $1.10^{10}$ cfu/g or cfu/mL, more preferably from about $1.10^9$ to about $1.10^{10}$ cfu/g or cfu/mL.

In one embodiment of the invention, the composition of the invention comprises an amount of the *Akkermansia* of the invention ranging from about $1.10^6$ to about $1.10^{11}$ cfu/g or cfu/ml of the composition, preferably from about $1.10^8$ to about $1.10^{11}$ cfu/g or cfu/mL, more preferably from about $1.10^{10}$ to about $1.10^{11}$ cfu/g or cfu/mL.

In one embodiment of the invention, the composition of the invention comprises an amount of the *Akkermansia* of the invention ranging from about $1.10^2$ to about $1.10^{15}$ cells/g of the composition, preferably from about $1.10^4$ to about $1.10^{12}$ cells/g of the composition, more preferably from about $1.10^5$ to about $1.10^{10}$ cells/g of the composition and even more preferably from about $1.10^6$ to about $1.10^6$ cells/g of the composition.

In one embodiment of the invention, the composition of the invention comprises an amount of the *Akkermansia* of the invention ranging from about $1.10^2$ to about $1.10^{15}$ cells/ml of the composition, preferably from about $1.1a4$ to about $1.10^{12}$ cells/mL of the composition, more preferably from about $1.10^5$ to about $1.10^{10}$ cells/mL of the composition and even more preferably from about $1.10^6$ to about $1.10^9$ cells/mL of the composition.

In one embodiment of the invention, the composition of the invention comprises an amount of the *Akkermansia* of the invention ranging from about $1.10^6$ to about $1.10^{10}$ cells/g or cells/mL of the composition, preferably from about $1.10^8$ to about $1.10^{10}$ cells/g or cells/mL, more preferably from about $1.10^9$ to about $1.10^{10}$ cells/g or cells/mL.

In one embodiment of the invention, the composition of the invention comprises an amount of the *Akkermansia* of the invention ranging from about $1.10^6$ to about $1.10^{11}$ cells/g or cells/mL of the composition, preferably from about $1.10^8$ to about $1.10^{11}$ cells/g or cells/mL, more preferably from about $1.10^{10}$ to about $1.10^{11}$ cells/g or cells/mL.

In one embodiment of the invention, the composition of the invention comprises an amount of fragment of the *Akkermansia* of the invention corresponding to an amount of *Akkermansia* of the invention ranging from about $1.10^2$ to about $1.10^{15}$ cfu/g of the composition, preferably from about $1.10^4$ to about $1.10^{12}$ cfu/g of the composition, more preferably from about $1.10^5$ to about $1.10^{10}$ cfu/g of the composition and even more preferably from about $1.10^6$ to about $1.10^9$ cfu/g of the composition.

In one embodiment of the invention, the composition of the invention comprises an amount of fragment of the *Akkermansia* of the invention corresponding to an amount of *Akkermansia* of the invention ranging from about $1.10^2$ to about $1.10^{15}$ cfu/mL of the composition, preferably from about $1.10^4$ to about $1.10^{12}$ cfu/mL of the composition, more preferably from about $1.10^5$ to about $1.10^{10}$ cfu/mL of the composition and even more preferably from about $1.10^6$ to about $1.10^9$ cfu/mL of the composition.

In one embodiment of the invention, the composition of the invention comprises an amount of fragment of the *Akkermansia* of the invention corresponding to an amount of *Akkermansia* of the invention ranging from about $1.10^6$ to about $1.10^{10}$ cfu/g or cfu/mL of the composition, preferably from about $1.10^8$ to about $1.10^{10}$ cfu/g or cfu/mL, more preferably from about $1.10^9$ to about $1.10^{10}$ cfu/g or cfu/mL.

In one embodiment of the invention, the composition of the invention comprises an amount of fragment of the

*Akkermansia* of the invention corresponding to an amount of *Akkermansia* of the invention ranging from about $1.10^6$ to about $1.10^{11}$ cfu/g or cfu/mL of the composition, preferably from about $1.10^8$ to about $1.10^1$ cfu/g or cfu/mL, more preferably from about $1.10^{10}$ to about $1.10^{11}$ cfu/g or cfu/mL.

In one embodiment of the invention, the composition of the invention comprises an amount of fragment of the *Akkermansia* of the invention corresponding to an amount of *Akkermansia* of the invention ranging from about $1.10^2$ to about $1.10^{15}$ cells/g of the composition, preferably from about $1.10^4$ to about $1.10^{12}$ cells/g of the composition, more preferably from about $1.10^5$ to about $1.10^{10}$ cells/g of the composition and even more preferably from about $1.10^6$ to about $1.10^9$ cells/g of the composition.

In one embodiment of the invention, the composition of the invention comprises an amount of fragment of the *Akkermansia* of the invention corresponding to an amount of *Akkermansia* of the invention ranging from about $1.10^2$ to about $1.10^{15}$ cells/mL of the composition, preferably from about $1.10^4$ to about $1.10^{12}$ cells/mL of the composition, more preferably from about $1.10^5$ to about $1.10^{10}$ cells/mL of the composition and even more preferably from about $1.10^6$ to about $1.10^9$ cells/mL of the composition.

In one embodiment of the invention, the composition of the invention comprises an amount of fragment of the *Akkermansia* of the invention corresponding to an amount of *Akkermansia* of the invention ranging from about $1.10^6$ to about $1.10^{10}$ cells/g or cells/mL of the composition, preferably from about $1.10^8$ to about $1.10^{10}$ cells/g or cells/mL, more preferably from about $1.10^9$ to about $1.10^{10}$ cells/g or cells/mL.

In one embodiment of the invention, the composition of the invention comprises an amount of fragment of the *Akkermansia* of the invention corresponding to an amount of *Akkermansia* of the invention ranging from about $1.10^6$ to about $1.10^{11}$ cells/g or cells/mL of the composition, preferably from about $1.10^8$ to about $1.10^{11}$ cells/g or cells/mL, more preferably from about $1.10^{10}$ to about $1.10^{11}$ cells/g or cells/mL.

In one embodiment, the *Akkermansia* and/or fragments thereof of the invention is pasteurized, and the amounts recited herein corresponds to amounts before the step of pasteurization.

In one embodiment the *Akkermansia* and/or fragments thereof of the invention is frozen, and the amounts recited herein corresponds to amounts before the freezing step.

The present invention further relates to a pharmaceutical composition comprising *Akkermansia* and/or fragments thereof and a pharmaceutically acceptable excipient for treating and/or preventing an oral disease. In one embodiment, the pharmaceutical composition of the invention comprises an effective amount of *Akkermansia* and/or fragments thereof.

Pharmaceutically acceptable excipients that may be used in the compositions of the invention include, but are not limited to, water, ion exchangers, alumina, aluminum stearate, lecithin, serum proteins, such as human serum albumin, buffer substances such as phosphates, glycine, sorbic acid, potassium sorbate, partial glyceride mixtures of saturated vegetable fatty acids, water, salts or electrolytes, such as protamine sulfate, disodium hydrogen phosphate, potassium hydrogen phosphate, sodium chloride, zinc salts, silica, colloidal silica, magnesium trisilicate, polyvinyl pyrrolidone, cellulose-based substances (for example sodium polyethylene glycol, polyacrylates, waxes, polyethylene-carboxymethylcellulose), polyoxypropylene-block polymers, polyethylene glycol and wool fat.

In one embodiment, the pharmaceutical composition of the invention may further contain antioxidant agents such as ascorbic acid, ascorbyl palmitate, BHT, potassium sorbate or *Rosmarinus officinalis* extracts.

In one embodiment, the pharmaceutical composition of the invention may further contain flavoring agents such as sugars, fruit or tea.

In one embodiment, compositions comprising the *Akkermansia* of the invention and/or fragments thereof of the invention can be prepared in water suitably mixed with a surfactant, such as hydroxypropylcellulose.

In one embodiment, the excipient can also be a solvent or dispersion medium containing, for example, water, ethanol, polyol (for example, glycerol, propylene glycol, and liquid polyethylene glycol, and the like), suitable mixtures thereof, and vegetables oils such as oleic acid.

The proper fluidity can be maintained, for example, by the use of a coating, such as lecithin (i.e., Soy lecithin or de-greased soy lecithin), by the maintenance of the required particle size in the case of dispersion and by the use of surfactants.

In some embodiments, it may be preferable to include isotonic agents, for example, sugars or sodium chloride. Generally, dispersions are prepared by incorporating the various sterilized active ingredients into a sterile vehicle which contains the basic dispersion medium and the required other ingredients from those enumerated above.

Another object of the present invention is a medicament comprising *Akkermansia* and/or fragments thereof for treating and/or preventing an oral disease. In one embodiment, the medicament of the invention comprises an effective amount of *Akkermansia* and/or fragments thereof.

In one embodiment, the medicament of the invention may further contain antioxidant agents such as ascorbic acid, ascorbyl palmitate, BHT, potassium sorbate or *Rosmarinus officinalis* extracts. In one embodiment, the medicament of the invention may further contain flavoring agents such as sugars, fruit or tea.

The present invention also relates to a medical device comprising *Akkermansia* and/or fragments thereof for treating and/or preventing an oral disease. In one embodiment, the medical device of the invention comprises an effective amount of *Akkermansia* and/or fragments thereof.

The present invention also relates to the cosmetic use of *Akkermansia* and/or fragments thereof for preventing and/or improving bad breath in a subject in need thereof. The term "bad beadth" may be replaced by the term "halitosis" throughout the present application.

Another object of the invention is thus a cosmetic composition comprising a cosmetically effective amount of *Akkermansia* and/or fragments thereof, and the use thereof for preventing and/or improving bad breath in a subject in need thereof. As used herein, a "cosmetically effective amount" refers to the amount of a cosmetic composition necessary and sufficient for promoting a cosmetic effect, such as, for example, for preventing and/or improving bad breath in a subject in need thereof.

The present invention also relates to the use of the *Akkermansia* and/or fragments or the cosmetic composition of the invention for preventing and/or improving bad breath in a subject in need thereof.

In one embodiment, the *Akkermansia* and/or fragments thereof, composition, pharmaceutical composition, medicament, cosmetic composition or medical device of the present invention, alone or in combination with another active principle, can be administered in a unit administration form, as a mixture with conventional pharmaceutical or cosmetic supports, to animals and human beings. Suitable unit administration forms comprise oral-route forms such as tablets, gel capsules, powders, granules and oral suspensions or solutions, sublingual and buccal administration forms, aerosols, implants, subcutaneous, transdermal, topical, intraperitoneal, intramuscular, intravenous, subdermal, transdermal, intrathecal and intranasal administration forms and rectal administration forms.

In one embodiment, the *Akkermansia* and/or fragments thereof, the composition, the pharmaceutical composition, medicament, cosmetic composition or medical device of the invention is to be administered systemically or locally.

In one embodiment, the *Akkermansia* and/or fragments thereof, the composition, pharmaceutical composition, medicament, cosmetic composition or medical device of the invention is to be administered orally, buccally, by injection, by percutaneous administration, parenterally, intraperitoneal, by endoscopy, topically, transdermally, transmucosally, nasally, by inhalation spray, rectally, vaginally, intratracheally, and via an implanted reservoir, or any combination thereof.

In one embodiment, the *Akkermansia* and/or fragments thereof, the composition, pharmaceutical composition, medicament, cosmetic composition or medical device of the invention is, or is to be, orally administered. Examples of formulations adapted to oral administration include, but are not limited to, solid forms, liquid forms and gels. Examples of solid forms adapted to oral administration include, but are not limited to, pill, tablet, capsule, soft gelatin capsule, hard gelatin capsule, dragees, granules, caplet, compressed tablet, cachet, wafer, sugar-coated pill, sugar coated tablet, or dispersing/or disintegrating tablet, powder, solid forms suitable for solution in, or suspension in, liquid prior to oral administration and effervescent tablet. Examples of liquid form adapted to oral administration include, but are not limited to, solutions, suspensions, drinkable solutions, elixirs, sealed phial, potion, drench, syrup, liquor and sprays.

Other examples of solid forms adapted to oral administration include, but are not limited to, (additives/supplements for) food or feed, food or feed premix, fortified food or feed, gums, chewing gums, tablets, pills, granules, dragees, capsules and effervescent formulations, such as powders and tablets.

In one embodiment, the *Akkermansia* and/or fragments thereof, the composition, pharmaceutical composition, medicament, cosmetic composition or medical device of the invention is in form of gums, chewing gums, tablets, pills, granules, dragees, capsules or effervescent formulations. In a particular embodiment, the *Akkermansia* and/or fragments thereof of the invention, the cosmetic composition or medical device of the invention is in form of gums, chewing gums, tablets, pills, granules, dragees, capsules or effervescent formulations.

Other examples of liquid forms adapted to oral administration include, but are not limited to, solutions, emulsions or suspensions such as, e.g., beverages, pastes and oily suspensions. The pastes may be incorporated in hard- or soft-shell capsules, whereby the capsules feature, e.g., a matrix of (fish, swine, poultry, cow) gelatine, plant proteins or ligninsulfonate.

In one embodiment of the invention, the *Akkermansia* and/or fragments thereof, the composition, pharmaceutical composition, medicament, cosmetic composition or medical device of the invention is in the form of a nutritional composition, i.e., comprises liquid or solid food, feed or drinking water. In one embodiment of the invention, the *Akkermansia* and/or fragments thereof of the invention, the composition, pharmaceutical composition, medicament, cosmetic composition or medical device of the invention is in the form of a food product. In another embodiment of the invention, the *Akkermansia* and/or fragments thereof of the invention, the composition, pharmaceutical composition, medicament, cosmetic composition or medical device of the invention is in the form of a dairy product.

Examples of food are dairy products including, but not limited to, cheese, yoghurts, milk-drinks, gums and chewing gums.

Beverages encompass non-alcoholic and alcoholic drinks as well as liquid preparations to be added to drinking water and liquid food. Non-alcoholic drinks include, but are not limited to, soft drinks, sports drinks, energy drinks, fruit juices, lemonades, teas and milk-based drinks. Liquid foods include, but are not limited to, soups and dairy products.

In one embodiment, the *Akkermansia* and/or fragments thereof, the composition, pharmaceutical composition, medicament, cosmetic composition or medical device of the invention is to be topically administered.

Examples of formulations adapted to topical administration include, but are not limited to pastes, tooth paste, sticks, waxes, creams, lotions, ointments, balms, gels, and the like.

In one embodiment, the *Akkermansia* and/or fragments thereof, the composition, pharmaceutical composition, medicament, cosmetic composition or medical device of the invention is in a form selected from the group comprising or consisting of tooth paste, mouthwash and dental gel. In one embodiment, the composition, pharmaceutical composition, medicament, cosmetic composition or medical device of the invention is in a form selected from the group comprising or consisting of tooth paste, mouthwash, mouth rinse and dental gel. In a particular embodiment, the cosmetic composition of the invention is in a form selected from the group comprising or consisting of tooth paste, mouthwash, mouth rinse and dental gel. In another particular embodiment, the medical device of the invention is in a form selected from the group comprising or consisting of tooth paste, mouthwash, mouth rinse and dental gel.

Topical administration characterizes the delivery, administration or application of the *Akkermansia* and/or fragments thereof of the invention, the composition, pharmaceutical composition, medicament, cosmetic composition or medical device of the invention directly to the site of interest for a localized effect (generally onto one or more exposed or outer surfaces thereof, such as the outermost layer of the epidermis, which is exposed and visually observable), e.g., using hands, fingers or a wide variety of applicators (rollup, roll-on or other stick container, tube container, cotton ball, powder puff, Q-tip, pump, brush, mat, cloth and/or the like). The application may be made, e.g., by laying, placing, rubbing, sweeping, pouring, spreading and/or massaging into, or onto, the skin, or by any other convenient or suitable method. Preferably, topical administration is affected without any significant absorption of components of the composition into the subject's blood stream (to avoid a systemic effect).

The *Akkermansia* and/or fragments thereof, composition, pharmaceutical composition, medicament, cosmetic composition or medical device of the invention can be mixed to form white, smooth, homogeneous, opaque cream or lotion with, e.g., benzyl alcohol 1% or 2% (w/w) as a preservative, emulsifying wax, glycerin, isopropyl palmitate, lactic acid, purified water and sorbitol solution. In addition, the compositions can contain polyethylene glycol 400 (PEG 400).

They can be mixed to form ointments with, e.g., benzyl alcohol 2% (w/w) as preservative, white petrolatum, emulsifying wax and tenox II (butylated hydroxyanisole, propyl gallate, citric acid, propylene glycol). Woven pads or rolls of bandaging material, e.g., gauze, can be impregnated with the compositions in solution, lotion, cream, ointment or other such form can also be used for topical application.

In one embodiment, the *Akkermansia* and/or fragments thereof, composition, pharmaceutical composition, medicament, cosmetic composition or medical device of the invention is to be injected. Examples of formulations adapted to injections include, but are not limited to, liquid solutions or suspensions, solid forms suitable for solution in, or suspension in, liquid prior to injection.

Examples of systemic injections include, but are not limited to, intravenous, intratumoral, intracranial, intralymphatic, intraperitoneal, intramuscular, subcutaneous, intradermal, intraarticular, intrasynovial, intrasternal, intrathecal, intravesical, intrahepatic, intralesional, intracavernous, infusion techniques and perfusion. In another embodiment, when injected, the composition, the pharmaceutical composition or the medicament of the invention is sterile. Methods for obtaining a sterile pharmaceutical composition include, but are not limited to, GMP synthesis (GMP stands for "Good manufacturing practice").

In one embodiment, the *Akkermansia* and/or fragments thereof, composition, pharmaceutical composition, medicament, cosmetic composition or medical device of the invention is to be administered in an immediate release form. In one embodiment, the *Akkermansia* and/or fragments thereof of the invention, the composition, pharmaceutical composition, medicament, cosmetic composition or medical device of the invention is to be administered in a mixed-release form. In one embodiment, the *Akkermansia* and/or fragments thereof, composition, pharmaceutical composition, medicament, cosmetic composition or medical device of the invention is to be administered in an enterically-coated form. In one embodiment, the *Akkermansia* and/or fragments thereof, composition, pharmaceutical composition, medicament, cosmetic composition or medical device of the invention is to be administered in a sustained-release form.

In one embodiment, the *Akkermansia* or fragments thereof, composition, pharmaceutical composition, medicament, cosmetic composition or medical device of the invention comprises a delivery system that controls the release of the active ingredients.

In one embodiment, the *Akkermansia* and/or fragments thereof, composition, pharmaceutical composition, medicament, cosmetic composition or medical device of the invention is to be administered at a dose determined by the skilled artisan and personally adapted to each subject.

In addition, the specific effective amount for any particular subject will depend upon a variety of factors including the specific composition employed, the age, body weight, general health, sex and diet of the subject; the time of administration, route of administration, the duration of the treatment; drugs used in combination or coincidental with the composition of the invention; and like factors well known in the medical, nutraceutical and cosmetic arts.

As used herein, the term "effective amount" encompasses "therapeutically effective mount" and "cosmetically effective amount".

In one embodiment, an effective amount of the *Akkermansia* and/or fragments thereof, the composition, pharmaceutical composition, medicament, cosmetic composition or medical device of the invention is to be administered at least once a day, at least twice a day, at least three times a day.

In one embodiment, an effective amount of the *Akkermansia* and/or fragments thereof, composition, pharmaceutical composition, medicament, cosmetic composition or medical device of the invention is to be administered every two, three, four, five, six days.

In one embodiment, an effective amount of the *Akkermansia* and/or fragments thereof, composition, pharmaceutical composition, medicament, cosmetic composition or medical device of the invention is to be administered twice a week, every week, every two weeks, once a month.

In one embodiment, an effective amount of the *Akkermansia* and/or fragments thereof, composition, pharmaceutical composition, medicament, cosmetic composition or medical device of the invention is to be administered every month, every two months, every three months, every four months, every five months, every six months, once a year.

In one embodiment, an effective amount of the *Akkermansia* and/or fragments thereof, composition, pharmaceutical composition, medicament, cosmetic composition or medical device of the invention is to be administered for a period of time of about one day, two days, three days, four days, five days, six days, a week, two weeks, three weeks, a month, two months, three months, six months, a year, or over longer periods such as, e.g., for several years or for the rest of the life of the subject.

The specific effective amount for any particular subject will depend upon a variety of factors including the disease being treated and the severity of the disease. For example, it is well within the skill of the art to start doses of a therapeutic compound at levels lower than those required to achieve the desired therapeutic effect and to gradually increase the dosage until the desired effect is achieved; but, at the opposite, it can be equally useful to start with a loading dose, a manner to reach steady-state plasma concentration more quickly (also referred to as a bolus), and then, optionally, to follow with a maintenance dose calculated to exactly compensate the effect of the elimination process.

It will be understood that the total daily usage of the *Akkermansia* and/or fragments thereof, composition, pharmaceutical composition, medicament or medical device of the invention will be decided by the attending physician within the scope of sound medical judgment.

In one embodiment, a therapeutically effective amount of the *Akkermansia* and/or fragments thereof, composition, pharmaceutical composition, medicament or medical device of the invention is to be administered for a chronic treatment. In another embodiment, a therapeutically effective amount of the *Akkermansia* and/or fragments thereof, composition, pharmaceutical composition or medicament of the invention is to be administered for an acute treatment.

In one embodiment, the effective amount of the *Akkermansia* of the invention administered per day is ranging from about $1.10^2$ to about $1.10^{15}$ cfu/day, preferably from about $1.10^5$ to about $1.10^{12}$ cfu/day, more preferably from about $1.10^8$ to about $1.10^{10}$ cfu/day, and even more preferably from about $1.10^9$ to about $1.10^{10}$ cfu/day.

In one embodiment, the effective amount of the *Akkermansia* of the invention administered per day is ranging from about $1.10^6$ to about $1.10^{10}$ cfu/day, preferably from about $1.10^8$ to about $1.10^{10}$ cfu/day, more preferably from about $1.10^9$ to about $1.10^{10}$ cfu/day.

In one embodiment, the effective amount of the *Akkermansia* of the invention administered per day is ranging from about $1.10^6$ to about $1.10^{11}$ cfu/day, preferably from about $1.10^8$ to about $1.10^{11}$ cfu/day, more preferably from about $1.10^{10}$ to about $1.10^{11}$ cfu/day.

In one embodiment, the effective amount of the *Akkermansia* of the invention administered per day is ranging from about $1.10^2$ to about $1.10^{15}$ cells/day, preferably from about $1.10^5$ to about $1.10^{12}$ cells/day, more preferably from about $1.10^8$ to about $1.10^{10}$ cells/day, and even more preferably from about $1.10^9$ to about $1.10^{10}$ cells/day.

In one embodiment, the effective amount of the *Akkermansia* of the invention administered per day is ranging from about $1.10^6$ to about $1.10^{10}$ cells/day, preferably from about $1.10^8$ to about $1.10^{10}$ cells/day, more preferably from about $1.10^9$ to about $1.10^{10}$ cells/day.

In one embodiment, the effective amount of the *Akkermansia* of the invention administered per day is ranging from about $1.10^6$ to about $1.10^{11}$ cells/day, preferably from about $1.10^8$ to about $1.10^{11}$ cells/day, more preferably from about $1.10^{10}$ to about $1.10^{11}$ cells/day.

In one embodiment, the effective amount of fragment of the *Akkermansia* of the invention administered per day corresponds to an amount of *Akkermansia* of the invention ranging from about $1.10^2$ to about $1.10^{15}$ cfu/day, preferably from about $1.10^5$ to about $1.10^{12}$ cfu/day, more preferably from about $1.10^8$ to about $1.10^{10}$ cfu/day, and even more preferably from about $1.10^9$ to about $1.10^{10}$ cfu/day.

In one embodiment, the effective amount of fragment of the *Akkermansia* of the invention administered per day corresponds to an amount of *Akkermansia* of the invention ranging from about $1.10^6$ to about $1.10^{10}$ cfu/day, preferably from about $1.10^8$ to about $1.10^{10}$ cfu/day, more preferably from about $1.10^9$ to about $1.10^{10}$ cfu/day.

In one embodiment, the effective amount of fragment of the *Akkermansia* of the invention administered per day corresponds to an amount of *Akkermansia* of the invention ranging from about $1.10^6$ to about $1.10^{11}$ cfu/day, preferably from about $1.10^8$ to about $1.10^{11}$ cfu/day, more preferably from about $1.10^{10}$ to about $1.10^{11}$ cfu/day.

In one embodiment, the effective amount of fragment of the *Akkermansia* of the invention administered per day corresponds to an amount of *Akkermansia* of the invention ranging from about $1.10^2$ to about $1.10^{15}$ cells/day, preferably from about $1.10^5$ to about $1.10^{12}$ cells/day, more preferably from about $1.10^8$ to about $1.10^{10}$ cells/day, and even more preferably from about $1.10^9$ to about $1.10^{10}$ cells/day.

In one embodiment, the effective amount of fragment of the *Akkermansia* of the invention administered per day corresponds to an amount of *Akkermansia* of the invention ranging from about $1.10^6$ to about $1.10^{10}$ cells/day, preferably from about $1.10^8$ to about $1.10^{10}$ cells/day, more preferably from about $1.10^9$ to about $1.10^{10}$ cells/day.

In one embodiment, the effective amount of fragment of the *Akkermansia* of the invention administered per day corresponds to an amount of *Akkermansia* of the invention ranging from about $1.10^6$ to about $1.10^{11}$ cells/day, preferably from about $1.10^8$ to about $1.10^{11}$ cells/day, more preferably from about $1.10^{10}$ to about $1.10^{11}$ cells/day.

In one embodiment, the *Akkermansia* and/or fragments thereof of the invention is co-administered with additional probiotic strains or species, such as, for example, bacterial probiotic strains or species; prokaryotes probiotics other than bacteria; or fungal strains or species, preferably yeast strains or species. In one embodiment, the composition, the pharmaceutical composition, the medicament, the cosmetic composition or the medical device of the invention further comprises additional probiotic strains or species, such as, for example, bacterial probiotic strains or species; prokaryotes probiotics other than bacteria; or fungal strains or species, preferably yeast strains or species.

In one embodiment, said additional probiotic strains or species are selected from those naturally present in the gut and/or mouth of the subject, preferably in the human gut or mouth, more preferably in the gut and/or mouth of substantially healthy human subjects. In one embodiment, said additional probiotic strains or species are selected for strains or species not found naturally in the gut and/or mouth of the subject such as those found for instance in dairy products.

Examples of bacterial probiotic strains or species that may be used in the present invention include, but are not limited to *Lactobacillus, Lactococcus, Bifidobacterium, Veillonella, Desemzia, Christensenella, Allobaculum, Coprococcus, Collinsella, Citrobacter, Turicibacter, Sutterella, Subdoligranulum, Streptococcus, Sporobacter, Sporacetigenium, Ruminococcus, Roseburia, Proteus, Propionibacterium, Leuconostoc, Weissella, Pediococcus, Streptococcus, Prevotella, Parabacteroides, Papillibacter, Oscillospira, Melissococcus, Dorea, Dialister, Clostridium, Cedecea, Catenibacterium, Butyrivibrio, Buttiauxella, Bulleidia, Bilophila, Bacteroides, Anaerovorax, Anaerostopes, Anaerofilum, Enterobacteriaceae, Fermicutes, Atopobium, Alistipes, Acinetobacter, Slackie, Shigella, Shewanella, Serratia, Mahella, Lachnospira, Klebsiella, Idiomarina, Fusobacterium, Faecalibacterium, Eubacterium, Enterococcus, Enterobacter, Eggerthella.*

Examples of prokaryote strains or species that may be used in the present invention include, but are not limited to Archaea, Firmicutes, Verrucomicrobia, Christensenella, Bacteroidetes (such as, for example, Allistipes, *Bacteroides ovatus, Bacteroides splachnicus, Bacteroides stercoris, Bacteroides vulgatus, Parabacteroides, Prevotella ruminicola*, Porphyromondaceae, and related genus), Proteobacteria, Betaproteobacteria (such as, for example, *Aquabacterium* and *Burkholderia*), Gammaproteobacteria (such as, for example, Xanthomonadaceae), Actinobacteria (such as, for example, Actinomycetaceae and *Atopobium*), Methanobacteria, Spirochaetes, Fibrobacteres, Deferribacteres, *Deinococcus, Thermus, Cyanobacteria,* Methanobrevibacteria, *Ruminococcus, Coprococcus, Subdolingranulum, Dorea, Bulleidia, Anaerofustis, Gemella, Roseburia, Dialister, Anaerotruncus, Staphylococcus, Micrococcus,* Propionibacteria, Enterobacteriaceae, *Faecalibacterium, Bacteroides, Parabacteroides, Prevotella, Eubacterium*, Bacilli (such as, for example, *Lactobacillus salivarius* and related species, *Aerococcus, Granulicatella, Streptococcus bovis* and related genus and *Streptococcus intermedius* and related genus), *Clostridium* (such as, for example, *Eubacterium hallii, Eubacterium limosum* and related genus) and *Butyrivibrio*.

Examples of fungal probiotic strains or species, preferably yeast probiotic strains or species that may be used in the present invention include, but are not limited Ascomycetes, Zygomycetes and Deuteromycetes, preferably from the groups *Aspergillus, Torulopsis, Zygosaccharomyces, Hansenula, Candida, Saccharomyces, Clavispora, Bretanomyces, Pichia, Amylomyces, Zygosaccharomyces, Endomycess, Hyphopichia, Zygosaccharomyces, Kluyveromyces, Mucor, Rhizopus, Yarrowia, Endomyces, Debaryomyces,* and/or *Penicillium*.

In one embodiment, the *Akkermansia* and/or fragments thereof of the invention ic co-administered with a prebiotic. In one embodiment, the composition, the pharmaceutical composition, the medicament, the cosmetic composition or the medical device of the invention further comprises a prebiotic.

Examples of prebiotics that may be used in the present invention include, but are not limited to, myo-inositol, inulin and inulin-type fructans, oligofructose, beta-glucans, xylose, arabinose, arabinoxylan, ribose, galactose, rhamnose, cellobiose, fructose, lactose, salicin, sucrose, glucose, esculin, tween 80, trehalose, maltose, mannose, mellibiose, mucus or mucins, raffinose, fructooligosaccharides, galacto-oligosaccharides, amino acids, alcohols, fermentable carbohydrates and any combinations thereof.

Other non-limiting examples of prebiotics include water-soluble cellulose derivatives, water-insoluble cellulose derivatives, unprocessed oatmeal, metamucil, all-bran, polyphenols and any combinations thereof.

Examples of water-soluble cellulose derivatives include, but are not limited to, methylcellulose, methyl ethyl cellulose, hydroxyethyl cellulose, ethyl hydroxyethyl cellulose, cationic hydroxyethyl cellulose, hydroxypropyl cellulose, hydroxyethyl methylcellulose, hydroxypropyl methylcellulose, and carboxymethyl cellulose.

In one embodiment, the *Akkermansia* and/or fragments thereof of the invention is co-administered with an antimicrobial agent and/or an anti-inflammatory agent.

In one embodiment, the antimicrobial agent is an antibiotic.

The present invention relates to a method for treating and/or preventing an oral disease in a subject in need thereof, comprising administering *Akkermansia* and/or fragments thereof, the composition, the pharmaceutical composition, the medicament or the medical device of the invention to the subject.

The present invention relates to a method for treating an oral disease in a subject in need thereof, comprising administering a therapeutically effective amount of the *Akkermansia* and/or fragment thereof, the composition, the pharmaceutical composition, the medicament or the medical device of the invention to the subject.

Another object of the present invention is a method for treating and/or preventing periodontal inflammation in a subject in need thereof, comprising administering *Akkermansia* and/or fragments thereof, the composition, the pharmaceutical composition, the medicament or the medical device of the invention to the subject.

In one embodiment, the term "bone" comprises or consists of bones of the mouth. In a particular embodiment, the term "bone" comprises or consists of jaws, including upper jaw (or maxilla) and lower jaw (or mandible), and alveolar bone.

The present invention also relates to a method for preventing or decreasing bone destruction, preferably for preventing or decreasing bone destruction associated with or due to an infection, in a subject in need thereof, wherein said method comprises administering to the subject a therapeutically effective amount of the *Akkermansia* and/or fragment thereof, the composition, the pharmaceutical composition, the medicament or the medical device of the invention. In one embodiment, the method of the invention is for preventing or decreasing destruction of jaws and alveolar bone.

The present invention also relates to a method for increasing bone regeneration in a subject in need thereof, wherein said method comprises administering to the subject of a therapeutically effective amount of *Akkermansia* and/or fragments thereof, the composition, the pharmaceutical composition, the medicament or the medical device of the invention. In one embodiment, the method of the invention is for increasing regeneration of jaws and alveolar bone.

The present invention also relates to a method for increasing bone health in a subject in need thereof, wherein said method comprises comprising administering to the subject a therapeutically effective amount of *Akkermansia* and/or fragments thereof, the composition, the pharmaceutical composition, the medicament or the medical device of the invention. In one embodiment, the method of the invention is for increasing health of jaws and alveolar bone.

The present invention also relates to a method for increasing bone growth in a subject in need thereof, wherein said method comprises comprising administering to the subject a therapeutically effective amount of *Akkermansia* and/or fragments thereof, the composition, the pharmaceutical composition, the medicament or the medical device of the invention. In one embodiment, the method of the invention is for increasing growth of jaws and alveolar bone.

The person in the art is familiar with techniques to evaluate bone destruction, bone heath, bone regeneration or bone growth. Examples of such technique include, but are not limited to, X-rays, computed tomography (CT), magnetic resonance imaging (MRI) and bone scan.

The present invention also relates to a method for decreasing the permeability of the oral epithelial barrier in a subject in need thereof, wherein said method comprises administering to the subject a therapeutically effective amount of the *Akkermansia* and/or fragment thereof, the composition, the pharmaceutical composition, the medicament or the medical device of the invention.

Method to determine the permeability of epithelial barriers are known in the art. Such methods include, but are not limited to the quantification of the expression level of genes involved in the establishment and/or maintenance of the epithelial barrier, such as, for example genes coding for occludins, claudins, junctional adhesion molecules (JAM), Integrin, E-cadherin, catenins, nectin, afadin, zonulin and zonula occludens (Z0)-1, Z0-2 and Z0-3.

The present invention also relates to a method to increase the proportion of *Akkermansia* in the oral microbiota of a subject in need thereof, wherein said method comprises administering to the subject a therapeutically effective amount of the *Akkermansia* and/or fragment thereof, the composition, the pharmaceutical composition, the medicament or the medical device of the invention.

In one embodiment, said increase of the proportion of *Akkermansia* in the oral microbiota of a subject is of at least 1%, preferably of at least 10%, more preferably of at least 25%, 30%, 40%, 50%, 60% 70%, 80%, 90%, more preferably of at least 100%, 200% and more, when compared to the proportion of *Akkermansia* in the oral microbiota of said subject before the administration.

The present invention relates to a method to increase the quantity of *Akkermansia* fragments, preferably of AMuc_1100 peptide and/or Akk:ermansia-derived extracellular vesicles in the mouth of a subject, wherein said method comprises administering to the subject a therapeutically effective amount of the *Akkermansia* and/or fragment thereof, the composition, the pharmaceutical composition, the medicament or the medical device of the invention.

Techniques to measure the quantity of a peptide are known in the art and include, without being limited to, immunohistochemistry, Multiplex methods (Luminex), western blot, enzyme-linked immunosorbent assay (ELISA), sandwich ELISA, fluorescent-linked immunosorbent assay (FLISA), enzyme immunoassay (EIA), radioimmunoassay (RIA) and the like.

In one embodiment, said increase of the quantity of the fragments of *Akkermansia* in the mouth of a subject is of at least 1%, preferably of at least 10%, more preferably of at least 25%, 30%, 40%, 50%, 60% 70%, 80%, 90%, more preferably of at least 100%, 200% and more, when compared to the quantity of *Akkermansia* fragment in the mouth of said subject before the administration.

When sharing the same environment, interactions between microorganisms may lead to competitive and/or collaborative effect.

The present invention thus further relates to a method for modulating the growth and/or biological activity of other microorganisms of the oral microbiota in a subject in need thereof, wherein said method comprises administering to the subject an effective amount of the *Akkermansia* of the invention, the composition, the pharmaceutical composition, the medicament, the cosmetic composition or the medical device of the invention.

The present invention also relates to a method for inhibiting the growth and/or biological activity of other microorganisms, preferably of *Porphyromonas gingivalis, Aggregatibacter actinomycetemcomitans, Streptococcus mutans, Streptococcus mutans, Streptococcus gordonii, Streptococcus oralis, Streptococcus sanguis, Treponema denticola*, and/or *Candida albicans* in the oral microbiota of a subject, wherein said method comprises administering to the subject an effective amount of the *Akkermansia* and/or fragments thereof of the invention, the composition, the pharmaceutical composition, the medicament, the cosmetic composition or the medical device of the invention.

The present invention also relates to a method for assisting in defense against pathogenic microorganisms, preferably against *Porphyromonas gingivalis, Aggregatibacter actinomycetemcomitans, Streptococcus mutans, Streptococcus mutans, Streptococcus gordonii, Streptococcus oralis, Streptococcus sanguis, Treponema denticol* and/or *Candida albicans* in a subject in need thereof, wherein said method comprises administering to the subject an effective amount of the *Akkermansia* and/or fragments thereof of the invention, the composition, the pharmaceutical composition, the medicament, the cosmetic composition or the medical device of the invention.

Numerous techniques, to measure the abundance of a microorganism in a sample from a subject are known in the art. These techniques are generally based on the detection of a specific protein and/or nucleic acid of said microorganisms (e.g. genes products detection methods mentioned hereinabove) and/or based on microscopic observation or a combination thereof (e.g. Fluorescent in situ hybridization (FISH), immunohistochemistry) and/or by sequencing the 16S IRNA genes, in particular using multiplexed next-generation sequencing (NGS) techniques that allows the identification and the determination of the relative proportion of different bacterial species in a sample. Illustrative implementations of such techniques are found in the example section bellow.

The present invention also relates to a method for controlling or modulating the immune response to pathogenic microorganisms in a subject in need thereof, wherein said method comprises administering to the subject a therapeutically effective amount of the *Akkermansia* and/or fragments thereof, the composition, the pharmaceutical composition, the medicament or the medical device of the invention. In one embodiment, the method is for controlling or modulating the oral immune response to pathogenic microorganisms.

The present invention also relates to a method for controlling or modulating oral tissues inflammatory response in a subject, wherein said method comprises administering to the subject a therapeutically effective amount of the *Akkermansia* and/or fragments thereof, the composition, the pharmaceutical composition, the medicament or the medical device of the invention.

Example of pathogenic microorganisms particularly relevant in the context of the present invention include, but is not limited to, *Porphyromonas gingivalis, Aggregatibacter actinomycetemcomitans, Streptococcus mutans, Streptococcus mutans, Streptococcus gordonii, Streptococcus oralis, Streptococcus sanguis, Treponema denticola* and/or *Candida albicans*.

The present invention also relates to a method to increase anti-inflammatory cytokine(s) secretion by macrophages in response to pathogenic microorganisms in a subject in need thereof, wherein said method comprises administering to the subject a therapeutically effective amount of the *Akkermansia* and/or fragments thereof of the invention, the composition, the pharmaceutical composition, the medicament or the medical device of the invention. In one embodiment, the method is for to increasing oral anti-inflammatory cytokine(s) secretion by macrophages in response to pathogenic microorganisms in a subject.

Exemplary anti-inflammatory cytokine whose secretion may be increased by the method of the invention include, but is not limited to interleukin (IL)-10.

The present invention hence relates to a method to decrease pro-inflammatory cytokine(s) secretion by macrophages in response to a pathogenic microorganism in a subject in need thereof, wherein said method comprises administering to the subject a therapeutically effective amount of the *Akkermansia* and/or fragments thereof of the invention, the composition, the pharmaceutical composition, the medicament or the medical device of the invention. In one embodiment, the method is for to decreasing oral pro-inflammatory cytokine(s) secretion by macrophages in response to pathogenic microorganisms in a subject.

Exemplary anti-inflammatory cytokine whose secretion may be increased by the method of the invention include, but is not limited to, IL-6.

The present invention also relates to a method to enhance the immune response to infection of oral epithelial cell by a pathogenic microorganism in a subject in need thereof, wherein said method comprises administering to the subject a therapeutically effective amount of the *Akkermansia* and/or fragments thereof, the composition, the pharmaceutical composition, the medicament or the medical device of the invention.

An exemplary enhancement of the response to infection by epithelial cell is, without being limited to, an increase in the secretion of IL-8 by said epithelial cell (i.e. stimulating the recruitment of polymorphonuclear cells).

The present invention also relates to a method for preventing and/or improving bad breath in a subject in need thereof, wherein said method comprises administering to the subject an effective amount of the *Akkermansia* and/or fragments thereof, the composition or the cosmetic composition of the invention.

In one embodiment, the subject is a human. In one embodiment, the subject is an animal, such as a pet.

In one embodiment, the subject is/was diagnosed with an oral disease.

In one embodiment, the subject is/was diagnosed with gingivitis. In a particular embodiment, the subject is/was diagnosed with classic gingivitis, pregnancy gingivitis or necrotizing ulcerative gingivitis.

In one embodiment, the subject is/was diagnosed periodontitis. In a particular embodiment, the subject is/was diagnosed with chronic periodontitis, aggressive periodontitis, systemic periodontitis or syndromic chronic periodontitis.

In one embodiment, the subject is not obese. As used herein, the term "non obese" refers to a subject having a BMI below about 40, preferably below about 35, more preferably below about 30. The "BMI" or "body mass index" is defined as the subject's body mass in kilograms divided by the square of his height in meters. The formulae universally used in medicine produce a unit of measure of $kg/m^2$.

In another embodiment, the subject is obese. As used herein, the term "obese" refers to a subject having a BMI above about 30, preferably above about 35, more preferably above about 40.

In one embodiment, the subject is at risk of developing an oral disease. Examples of risk factors may include, without limitation, obesity, smoking, poor oral hygiene and sugar-rich diets.

In one embodiment of the invention, the subject presents a deregulation of the gut and/or oral microbiota composition. Preferably, the gut and/or microbiota of said subject is depleted in the bacterium of the invention, more preferably as compared to the gut and/or microbiota of a substantially healthy subject.

Another object of the present invention is a kit comprising the *Akkermansia* and/or fragments thereof of the invention, the composition, the pharmaceutical composition, the medicament, the cosmetic composition or the medical device of the invention as described herein above.

In one embodiment, the kit is for implementing a method of the invention as described hereinabove. In a particular embodiment, the kit is for use in treating an oral disease.

BRIEF DESCRIPTION OF THE FIGURES

(FIG. 3A) are photographs showing macroscopic views of the alveolar bone following *P. gingivalis*-induced periodontitis with (Pg+Akk) or without (Pg) *A. muciniphila* administration in C57/BL6 mice. FIG. 3 (B) is a series of graphs comparing the distance between cemento-enamel junction (CEJ) and the alveolar bone crest (ABC) in C57/BL6 mice following *P. gingivalis*-induced periodontitis with (Pg+Akk) or without (Pg) *A. muciniphila* administration (n=5 individuals/group).

—:Pg vs Akk or Pg+Akk;—p 0.05,——p 0.01.

FIG. 5A-F is a series of graphs showing the relative expression of mRNAs in BMM<I> derived from C57/BL6 mice following a 4 h culture with either (i) *P. gingivalis* (Pg), (ii) *A muciniphila* (Akk:) or (iii) both (Pg+Akk:). (FIG. 5A-B) relative expression of M1 BMM<I> phenotype markers TNF-α (A) and IL-15ra (B). (FIG. 5C-F) relative expression of M2 and M2 subtype a, band d BMM<I> phenotype markers IL-10 (C), C—C motif Chemokine 17 ligand (CCL 17—FIG. 5D), Sphingosine Kinase 1 (SPHK1—FIG. 5E) and vascular endothelial growth factor A (VEGF-A—FIG. 5F). All values are expressed as mean±SEM (n=3). Data were analyzed via one-way ANOVA or 2-tailed unpaired Student's t test.—: Pg vs Akk: or Pg+Akk:;—p 0.05,——p 0.01.

Figure 6A:
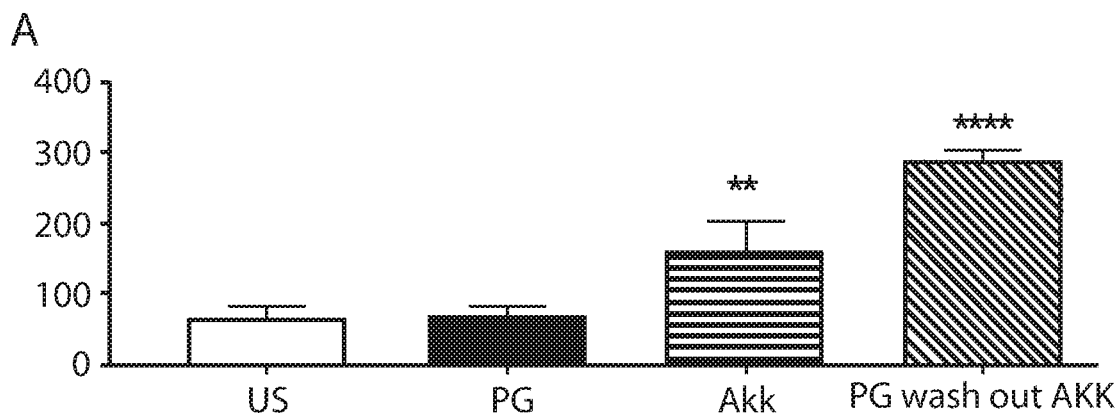
Figure 6B:
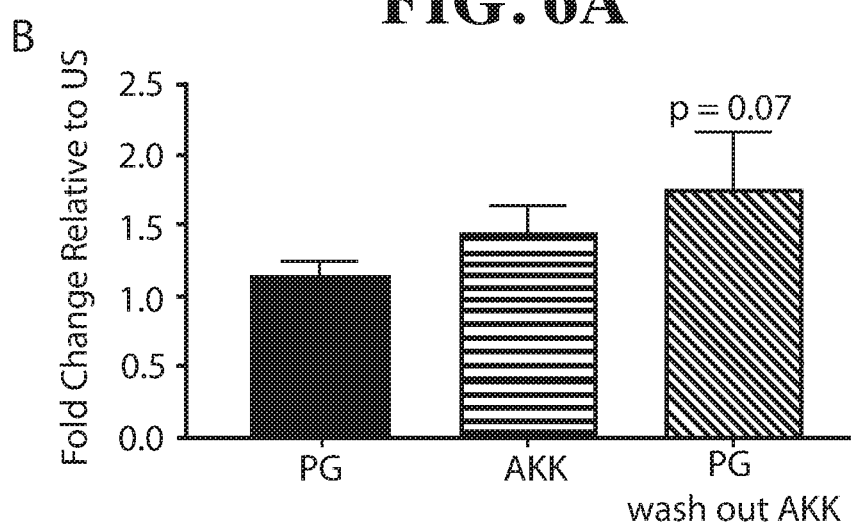
Figure 6C:
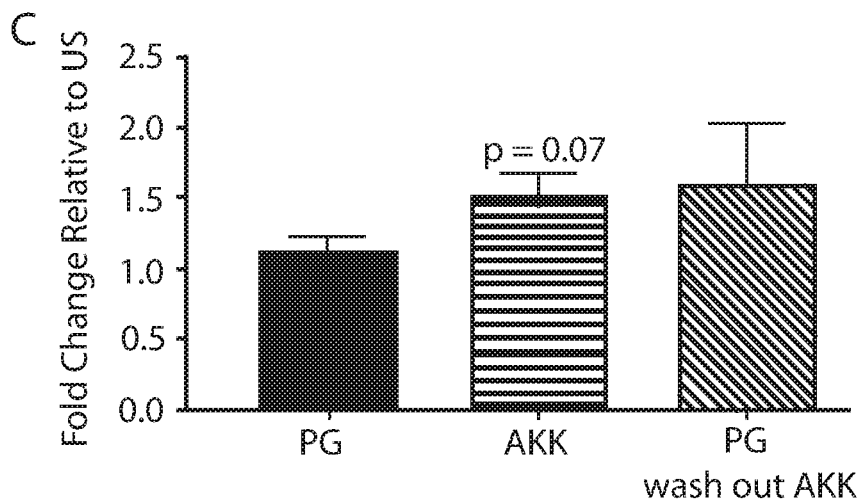
Figure 6D:
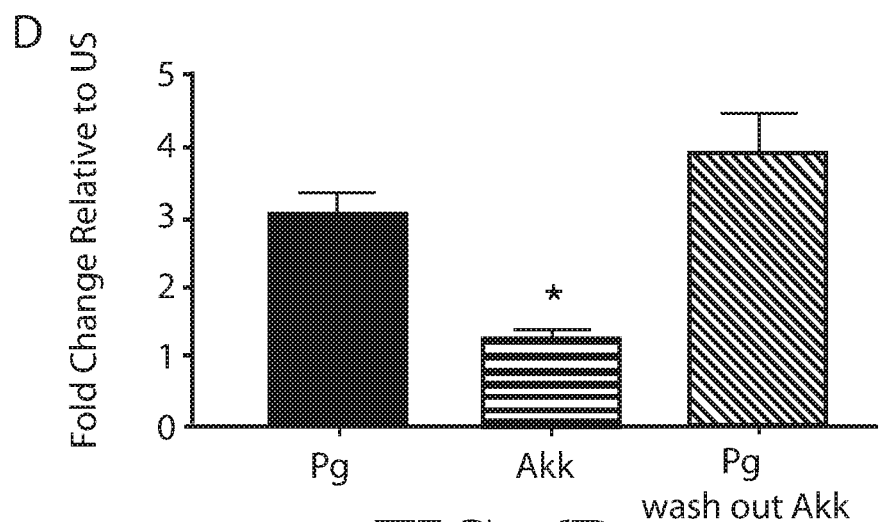
Figure 6E:
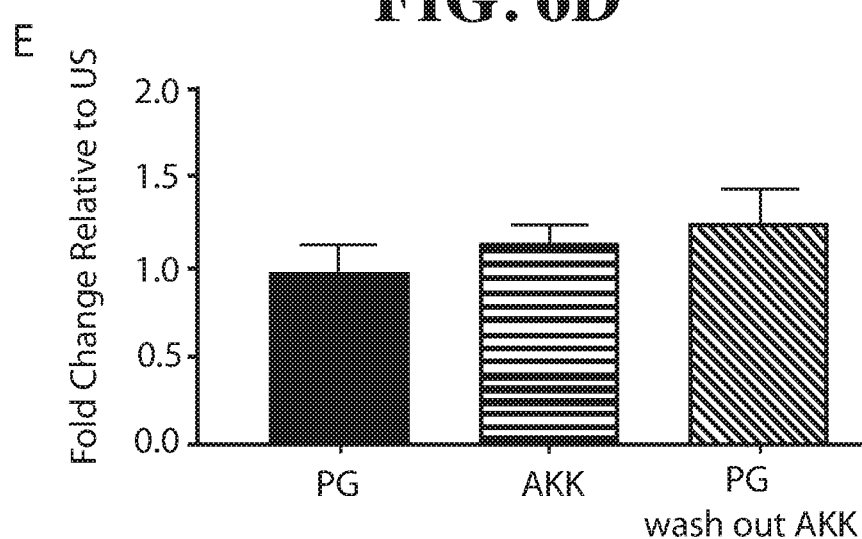
Figure 6F:
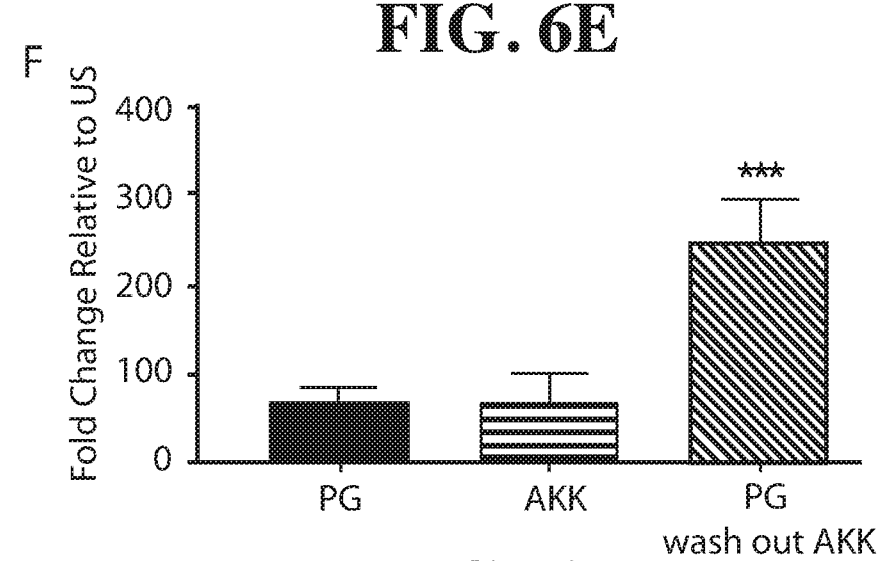

FIG. 6A-F is a series of graphs showing the effect of associated with bacterial cell co-culture on IL-8 secretion (FIGS. 6A and F) and expression of epithelial integrity markers (Integrin B1—FIG. 6B; FIG. 6E—Cadherin—FIG. 6C; Occludin—FIG. 6D; Zonula Occludens—1 (ZO-1)—FIG. 6E) in TIGK gingival epithelial cells following a 4 h co-culture with either *P. gingivalis* (PG or Pg), *A. muciniphila* (Akk: or AKK), or no bacterial cell (US). All values are expressed as mean±SEM (n=3). Data were analyzed via one-way ANOVA or 2-tailed unpaired Student's t test. \*Pg vs other conditions. \*p 0.05, \*\*p 0.01, \*\*\*p 0.001, \*\*\*\*p 0.0001.

Figure 7A:
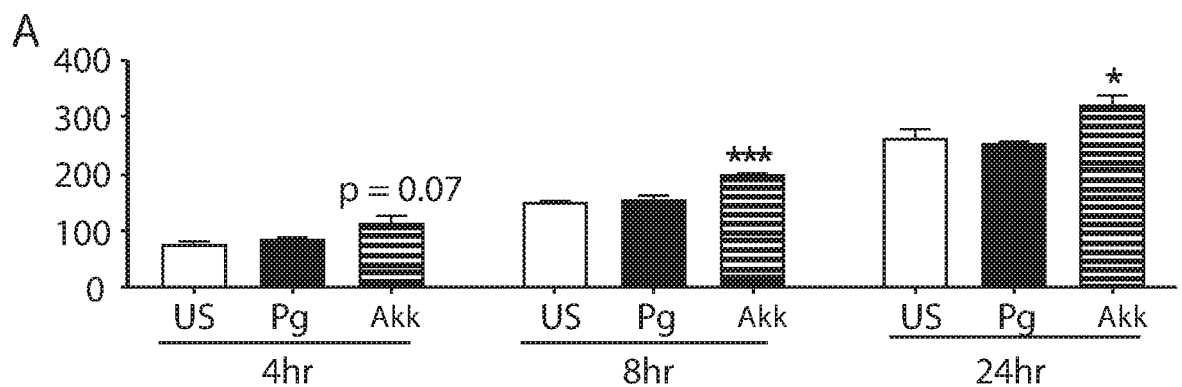
Figure 7B:
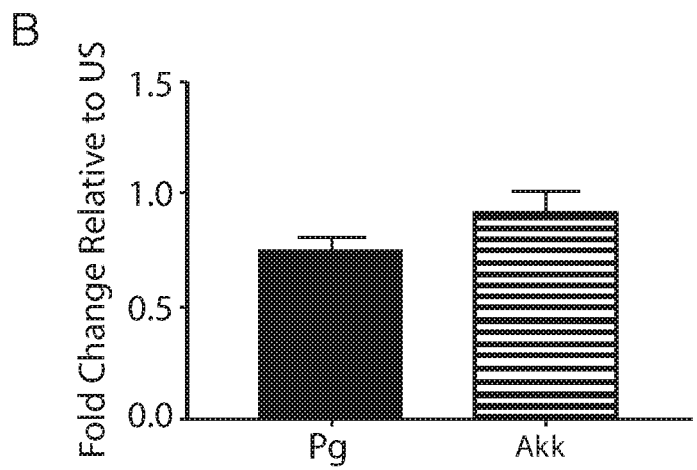
Figure 7C:
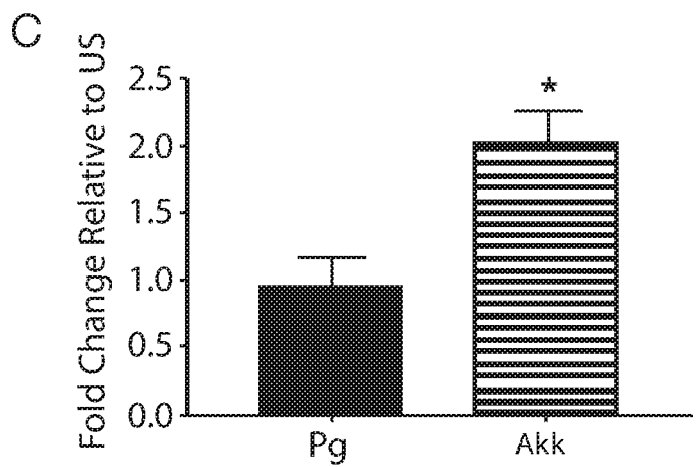
Figure 7D:
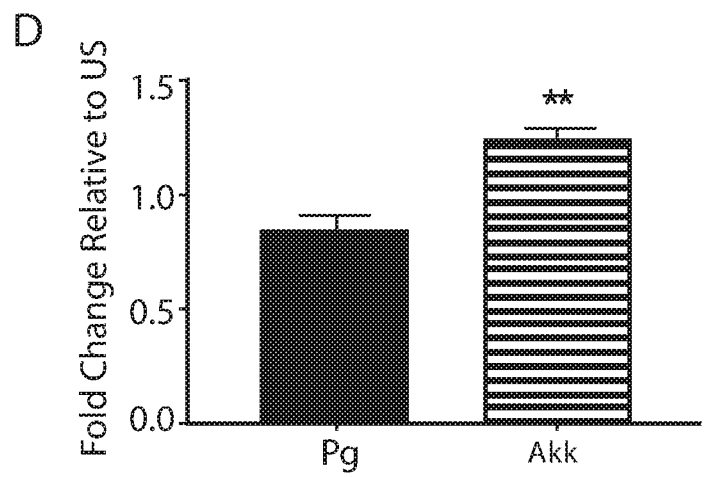
Figure 7E:
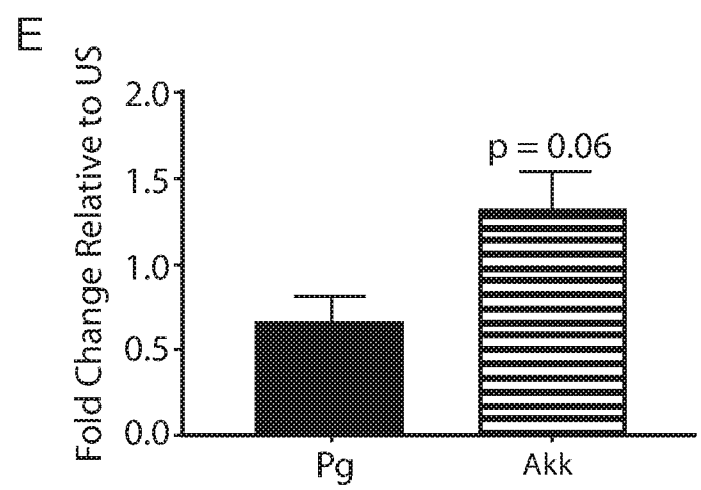
Figure 7F:
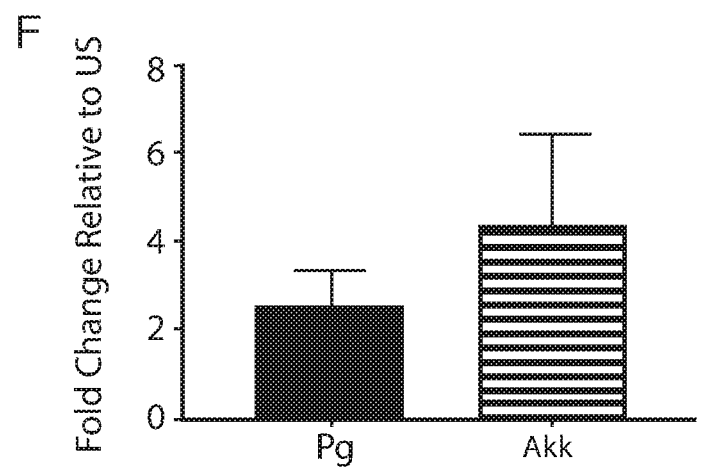
Figure 8A:
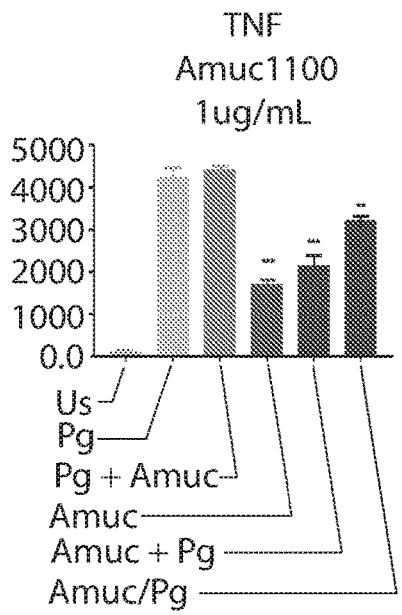
Figure 8B:
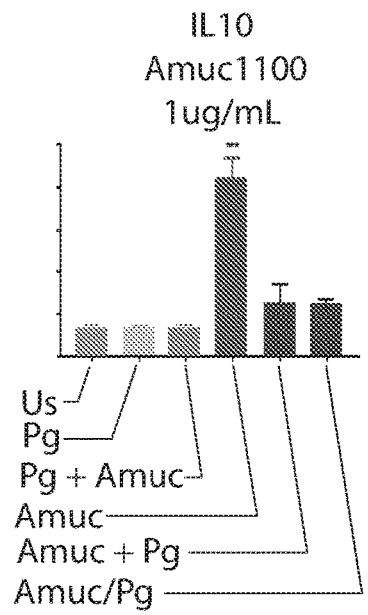
Figure 8C:
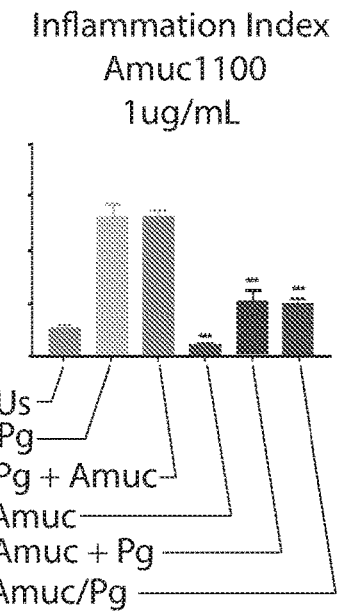
Figure 8D:
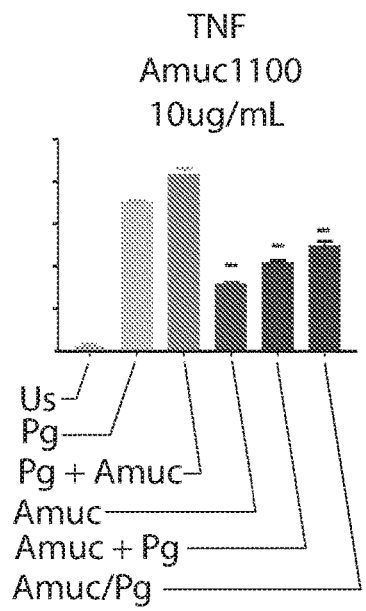
Figure 8E:
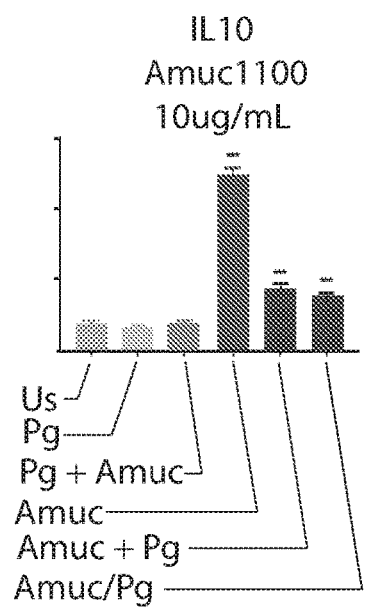
Figure 8F:
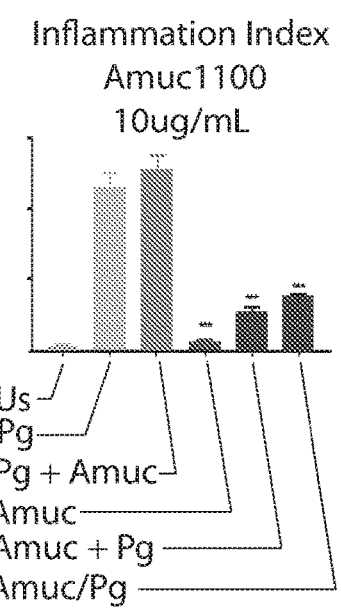

FIG. 7A-F is a series of graph showing the effect of associated with bacterial cell co-culture on IL-8 secretion (FIGS. 7A and 7F) and expression of epithelial integrity markers (Integrin B1—FIG. 7B; E—Cadherin—FIG. 7 C; Occludin—FIG. 7D; Zonula Occludens-1 (ZO-1)—FIG. 7E) in HT29 colonic epithelial cells following a co-culture with either either *P. gingivalis* (PG or Pg), *A. muciniphila* (Akk or AKK) or no bacterial cell (US). ZO-1: zonula occludens 1. All values are expressed as mean±SEM (n=3). Time in A indicates the co-culture duration. Data were analyzed via one-way ANOVA or 2-tailed unpaired Student's t test.\*Pg vs other conditions: \*p 0.05, \*\*p 0.01, \*\*\*p 0.001.

FIG. 8A-F. is a series of graphs showing the effect associated with Pili-like protein Amuc_1 100 modulating the inflammatory response of lean BMM to *P. gingivalis* infection. Cytokine production analyzed by ELISA 8-hours post infection with either *P. gingivalis* alone (Pg), Pili-like protein Amuc_1 100 was added to cultures at two concentrations (1 ug/mL or 10 ug/mL) either alone (Amuc), 4-hours before *P. gingivalis* infection (Amuc+Pg), 4-hours after *P. gingivalis* infection (Pg+ Amuc), or simultaneous to the addition of *P. gingivalis* (Amuc/Pg).

Data was analyzed via One-way ANOVA. All values are expressed as a mean+/−SEM (n=3).

Figure 9A:
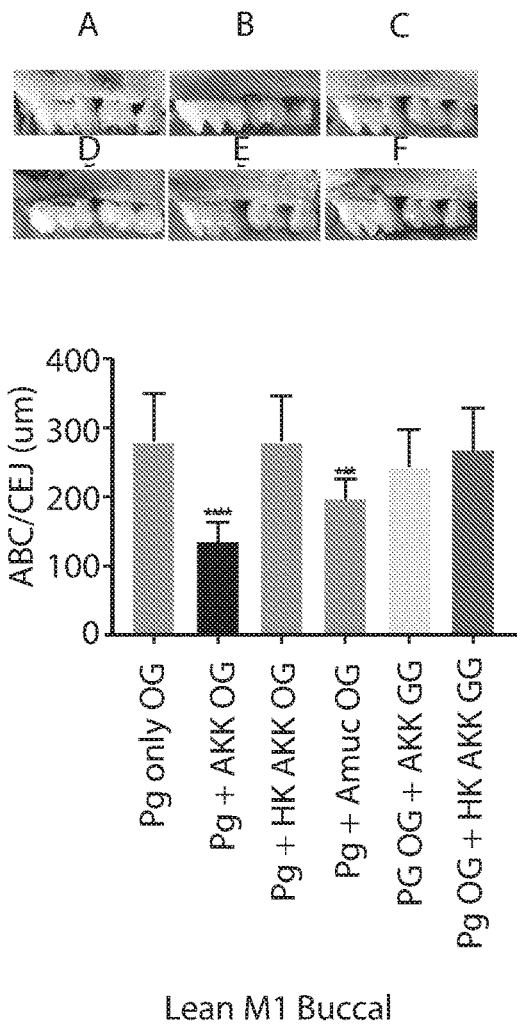
Figure 9B:
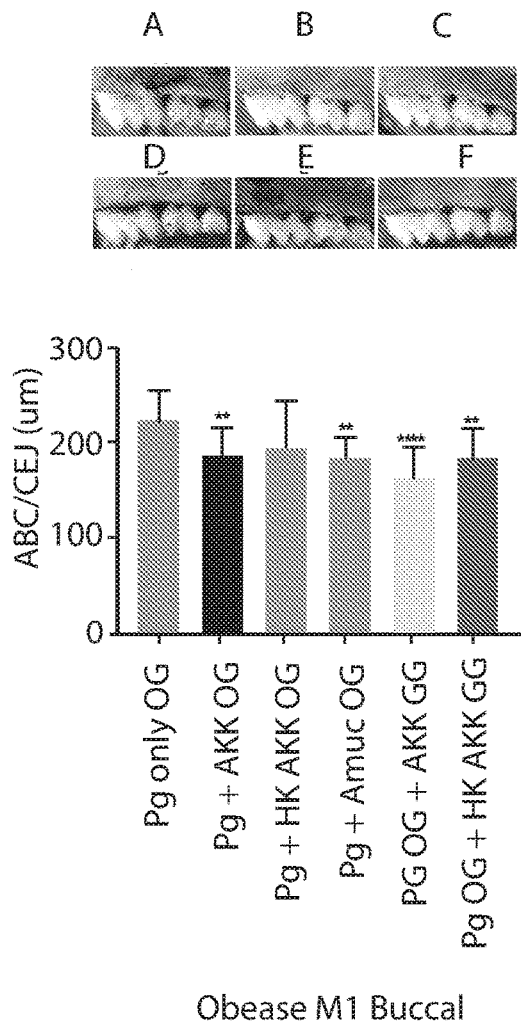

FIG. 9A-B. comprises photographs and charts showing how bone loss in lean and obese mice is tempered by *A. muciniphila* and pili-like protein Amuc_1100. Bone loss is defined as the distance between the alveolar bone crest (ABC) and cementa-enamel junction (CEJ). Measurements were taken at 6 sites from the mesial aspect of the first molar to the distal aspect of second molar. Bone loss was expressed as a mean+/−SEM in μm. (Pg=*P. ginvivalis*; AKK=*A. muciniphila*; HK=heat killed; Amuc=Amuc_1100; OG=oral gavage; GG=gastric gavage).

EXAMPLES

The present invention is further illustrated by the following examples.

Bacterial Cultures

*Akkermansia muciniphila* MucT (American Type Culture Collection-ATCC® BAA-835™) was grown anaerobically (N2/CO2, 80/20 v/v) in brain heart infusion broth (Criterion, Hardy diagnostics, CA, USA) supplemented with 3% commercial hog gastric mucin (Type III, Sigma-Aldrich, St. Louis, MO, USA) as previously described (Derrien et al., 2004) and grown in 10 mL Hungate anaerobic tubes (Chemglass Life Sciences, NJ, USA). The concentration of bacteria was estimated by measuring absorbance at 600 nm. Liquid cultures were washed and resuspended in sterile anaerobic phosphate-buffered saline (PBS) to the required concentration prior to each experiment.

The *Porphyromonas gingivalis* 381 strain (Tanner et al., 1979) was cultured and maintained in brain heart infusion media supplemented with hemin (5 µg/mL, Sigma-Aldrich) and menadione (1 µg/mL, Sigma-Aldrich) in an anaerobic environment (AnaeroPack-Anaero, Mitsubishi Gas Chemical Co., New York, NY, USA) at 37° C. for 48 h. Cell density was measured by absorbance at 600 nm. Liquid cultures were centrifuged at 4000 rpm for 10 minutes, cell pellets were washed twice and resuspended in sterile PBS to required concentration prior to each experiment.

Animals

Twenty-two weeks old C57/BL6 mice were obtained from Taconic Biosciences (NY, USA). All mice were housed three per cage at the New York Medical College Animal Facility, on a 12 h light dark cycle and ad libitum access to food and water. Animals received a standard chow diet (5% Kcal fat).

Example 1: *A. muciniphila* Decreases *P. gingivalis*-Induced Soft Tissue Inflammation and Calvarial Bone Destruction Methods Mouse Calvarial Bone Resorption Model Mice were separated into the following four treatment groups (n=6): (i) PBS, (ii) *P. gingivalis* alone, (iii) *A. muciniphila* alone and (iv) *P. gingivalis* and *A. muciniphila* injected combined. Mice were anesthetized by the intraperitoneal injection of ketamine-xylazine (Akorn Animal Health, Lake Forest, IL, USA). The heads of mice were shaved and cells of *P. gingivalis* ($5 \times 10^8$), *A. muciniphila* ($10^9$) or no cells in 100 µL of PBS were injected subcutaneously in the 4 treatment groups with a 30.5-gauge needle at a point on the midline of the skull between the ears and eyes as described previously {Huck: 2017gj}. Lesions were photographed each day for 5 days. Mice were sacrificed 5 days post injection. The size of the lesion resulting from the injection in each animal (area in square millimeters) was analyzed using ImageJ software.

Histological Analysis

Dissected calvaria were fixed in 4% paraformaldehyde in PBS (Sigma-Aldrich) overnight at 4° C. and decalcified after glycerol wash {Huck: 2017gj}. Samples were stored at 40° C. in 30% sucrose/PBS until processing. Samples were embedded in Optimal Cutting Temperature embedding media (Fisher HealthCare, Suwanee, GA, USA) and frozen for cryostat sectioning. 5-10 µm sections were stained with hematoxylin and eosin (H&E) (Fisher Scientific, Suwanee, GA, USA) and prepared for further analysis.

To evaluate osteoclast activity, a tartrate-resistant acid phosphatase (TRAP) assay was performed as described previously {Chiang: 1999we}. Quantification of both inflammatory infiltrate and osteoclast activity was performed by two blinded examiners according to three different scoring protocols {Huck: 2017gj}:

1. calvarial bone resorption was scored on a scale of O through 4, with
   a. 0 corresponding to no calvarial bone resorption;
   b. 1 meaning that one-fourth of the calvarial bone was affected but there was no through-and-through penetration;
   c. 2 meaning that half of the calvarial bone was affected but there was no through-and-through penetration;
   d. 3 meaning that half of the calvarial bone was affected with through-and-through bone penetration <1 mm in width; and,
   e. 4 meaning that more than half of the calvarial bone was affected with through-and-through bone penetration >1 mm wide.

2. osteoclast activity was scored on a scale of Oto 3, with
   a. 0 corresponding to no osteoclast activity with no sign of bone resorption;
   b. 1 corresponding to the presence of some osteoclast lacunae with minimum bone resorption;
   c. 2 corresponding to the presence of 5 to 10 osteoclast lacunae with bone resorption; and,
   d. 3 corresponding to the presence of >10 osteoclast lacunae and severe bone resorption.

3. Inflammatory Cell Infiltration (ICI) was scored on a scale of O through 5, with
   a. 0 corresponding to no sign of inflammation;
   b. 1 corresponding to incipient ICI in the derma/subderma;
   c. 2 corresponding to mild ICI in the dermal subderma;
   d. 3 corresponding to moderate ICI in the derma/subderma and scarce inflammation in the surrounding bone;
   e. 4 corresponding to advanced ICI in the derma/subderma and mild inflammation in the surrounding bone; and,
   f. 5 corresponding to severe ICI in the derma/subderma and advanced inflammation in the surrounding bone.

Results

Figure 1:
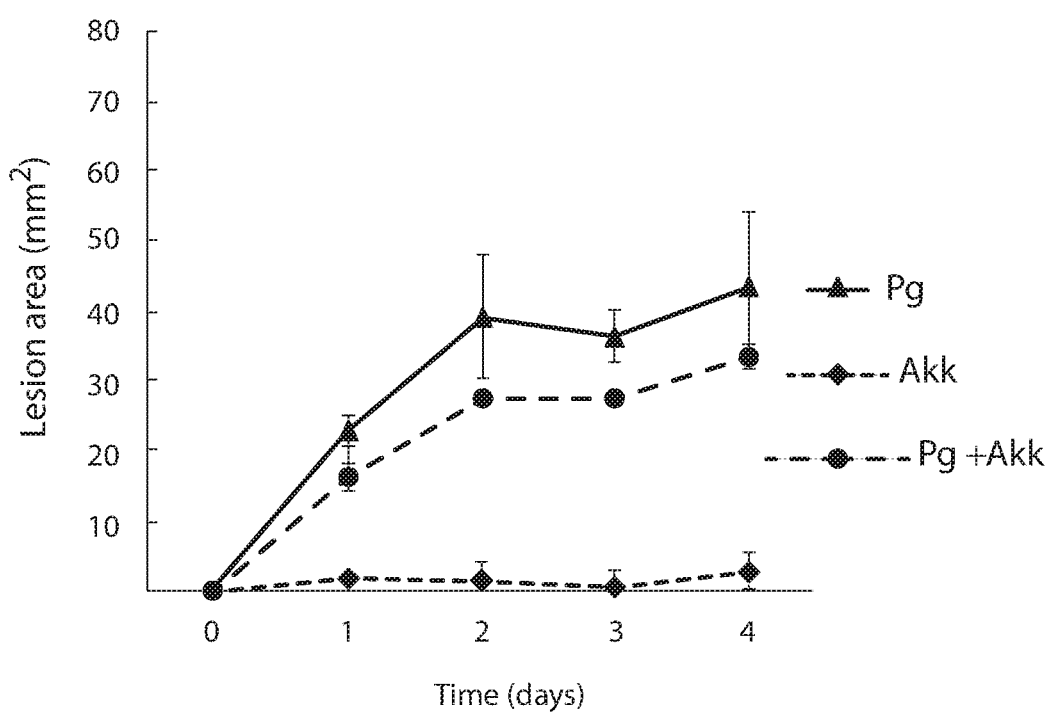
FIG. 1 is a series of graphs showing the evolution of the size of the lesions at the calvaria resulting from the injection of *P. gingivalis* (Pg), *A. muciniphila* (Akk), or both (Pg+Akk) in C57/BL6 mice (n=5 individual for each condition).
Figure 2A:
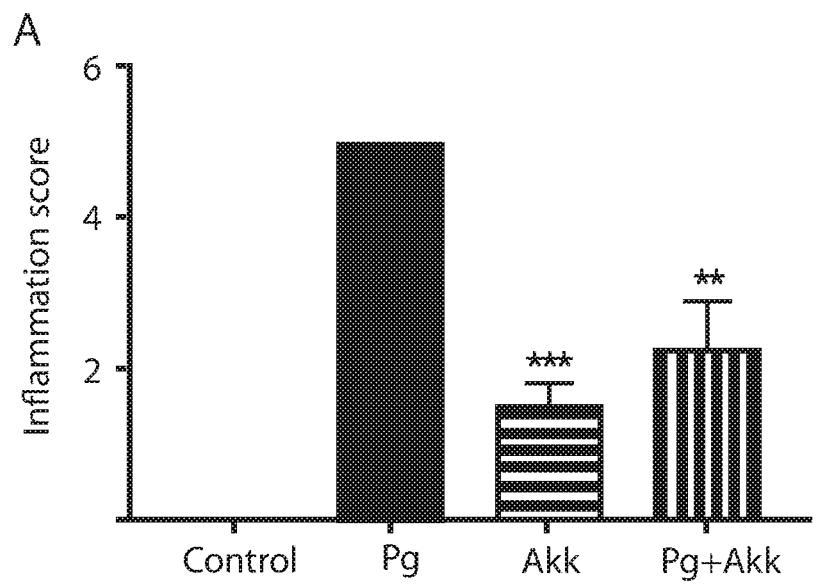
FIG. 2A-B. is a series of graphs showing the quantification of the inflammation score (haematoxylin and eosin (H&E) staining—(FIG. 2A) and osteoclast score (tartrate-resistant acid phosphatase (TRAP) staining—FIG. 2B) evaluated on dissected calvaria from C57/BL6 mice. All values are represented as mean±SEM (n=4). Comparison was made with *P. gingivalis* injected group. Results were analyzed by one-way ANOVA, or unpaired Student's t-test with differences considered significant at \*:p:::; 0.05, \*\*:p:::; 0.01 and \*\*\*:p:::; 0.001. Pg: *P. gingivalis* injected group; Akk: *A. muciniphila* injected group; Pg+Akk: *P. gingivalis*+*A. muciniphila* injected concomitantly.
Figure 2B:
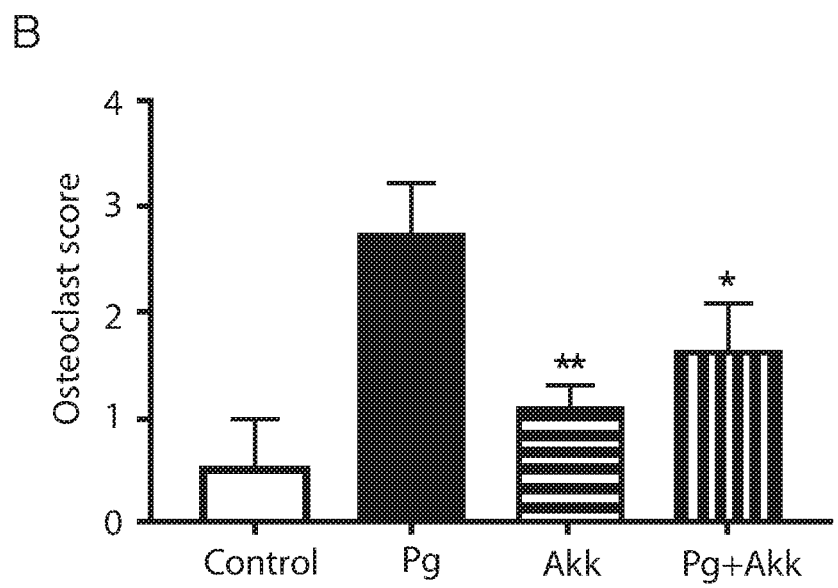

The impact of *A. muciniphila* administration on soft tissue inflammation and bone destruction induced by *P. gingivalis* was evaluated in a calvarial model of acute infection. *P. gingivalis* and *A. muciniphila* were injected at calvarial site in mice. While PBS injection did not induce any significant lesion, the subcutaneous injection of *P. gingivalis* induced a visible lesion affecting both soft and hard tissues in animals (FIG. 1). The injection of *A. muciniphila* alone did not induce any lesion mice. However, combined injection of *P. gingivalis* and A *muciniphila* reduced the size of the induced lesion in animals when compared with lesions resulting from the injection of *P. gingivalis* alone (FIG. 1). Histological analysis revealed that the effect associated with the presence of *A. muciniphila*, was correlated to a concomitant decrease of inflammatory cells infiltration within soft tissues (FIG. 2, A) and a reduced osteoclast activity as shown with TRAP staining (FIG. 2, C).

Example 2: Therapeutic Administration of *A. muciniphila* Reduced *P. gingivalis*-Induced Alveolar Bone Destruction Methods
Induction of Periodontitis and *A. muciniphila* Administration Sterile black braided 6.0 silk sutures were incubated in bacterial culture medium with *P. gingivalis* for 1 day in anaerobic conditions. Following anesthesia, *P. gingivalis* soaked 6.0 ligatures were placed in the sulcus around the maxillary first and second molars as previously described {SaadiThiers: 2012by}. Ligatures were replaced 3 times/week during 5 weeks. On days in-between ligature placement, oral gavage with *P. gingivalis* ($5 \times 10^8$ cells) was performed as previously described {Alshammari: 2017ip}. After 5 weeks of periodontitis induction, the ligatures were removed and mice were split in two groups (i) with daily oral gavage of *P. gingivalis* alone ($5 \times 10^8$ cells) and (ii) with daily oral gavage of *A. muciniphila* ($10^9$ cells) and with *P. gingivalis* for an additional 2 weeks.

Morphometric Analysis

Palatal bone was processed for morphometric analysis after mechanical defleshing for 15 min in boiling water, washed in PBS and then exposed overnight in 3% hydrogen peroxide. The palatal bones were treated with 10% bleach for 1 min, washed with PBS 3 times 5 min and then dried at 37° C. Bone staining was performed at room temperature with 1% methylene blue (Sigma-Aldrich) for 1 min, washed and dried 30 min at 37° C. {Alshammari: 2017ip}. Bone loss was considered as the distance between CEJ and the most coronal alveolar bone. Measurements were taken at 6 points from the mesial aspect of the first molar to the distal aspect of second molar. Bone loss was expressed as a mean+/−SD.

Results

To evaluate the potential therapeutic effect of *A. muciniphila* in the management of periodontitis, *A. muciniphila* administration was performed in an experimental model of *P. gingivalis*-induced periodontitis by administering *A. muciniphila* after 5 weeks of periodontitis induction.

Figure 3A:
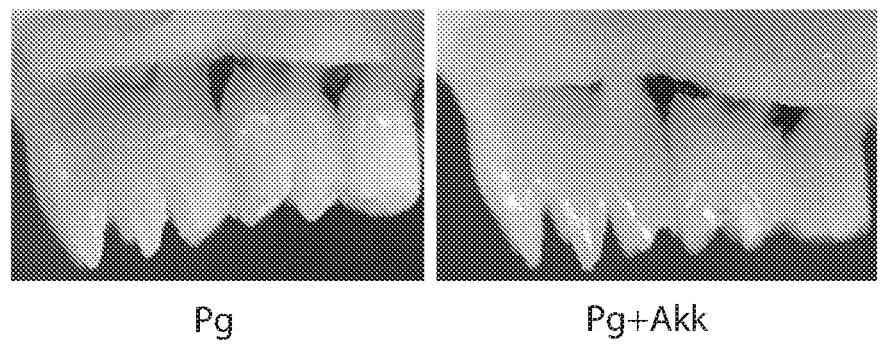
FIG. 3A-B.
Figure 3B:
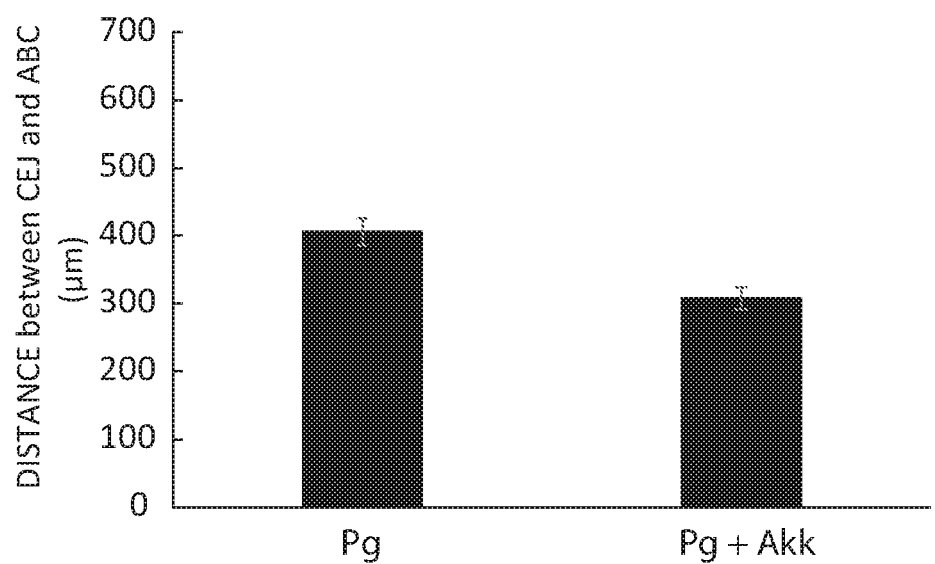

Periodontal lesion obtained following induction by *P. gingivalis* were observed in mice (FIG. 3). Moreover, administration of *A. muciniphila* contributed to a significant reduction of alveolar bone loss (FIG. 3), highlighting its protective role in the context of periodontal destruction.

Example 3: *A. muciniphila* Administration is Associated with a Shift of Periodontal and Gut Microbiota Materials and Methods Material
Oral and Fecal Sample Collection and Storage Oral samples were collected by gently rubbing a sterile paper point over gums and teeth. Paper points were immediately placed into a sterile tube and stored at −80° C. Fresh fecal samples were collected from mouse into sterile tube and stored at −80° C. until analysis.

Methods
DNA Extraction, Sequencing and Data Processing

DNA was isolated from oral and fecal samples as described previously {Caporaso: 2012fz}. Samples were placed in PowerBead Tubes and vortexed for 10 min at maximum speed using a 24-sample vortex adapter. The samples were processed following the manual and protocols according to the instructions in the DNeasy PowerSoil Kit Handbook (Qiagen, CA). The quality and quantity of DNA was determined by fluorometric quantification and by measuring A260/A280 ratios. In addition, the DNA was visualized by agarose gel electrophoresis. The resulting DNA was subsequently used for library construction for 16S rRNA gene sequencing. For 16S rRNA library preparation, modified 515fB and 806rB primers were used to amplify the V4 region of the 16S gene {Apprill: 2015gb}. The 16S rRNA gene amplicons were purified by a bead-based approach and quantified using a fluorometric assay. Sequencing adapters were then added using the QIASeq™ 1-Step Amplicon Kit. Adapter ligation and library purification were performed according to the kit instructions. All 16S rRNA gene libraries were quantified using the QIASeq Library Quant Kit and paired-end sequencing (2×250 bp) was performed on a benchtop sequencer Illumina NextSeq550. Sequencing adapters were directly added to the fragmentation reaction product. The ligation reaction and library purification steps were performed according to the QIASeq PX DNA Library Kit instructions. The generated library was further quantified {Walters: 2016gg}. For bioinformatics analysis, the CLC Microbial Genomics Module as part of the CLC Genomics Workbench was used. For 16S rRNA gene data analysis, raw sequencing reads were imported into the CLC Microbial Genomics Module (Qiagen) and then the OTU clustering module and NGS Core Tools were used to merge paired-end reads and perform quality control. OTUs were then picked by mapping sequences against the Greengenes database and clustering at 97% identity. Next, OTUs were aligned using MUSCLE and used to construct a Maximum Likelihood phylogenetic tree, followed by alpha and beta diversity analyses. All analysis steps were performed according to the standard specifications in the CLC Microbial Genomics Module.

Diversity analysis, rarefaction analysis, estimation of FDR, was performed. Enrichments of microbial OTUs were calculated using Wilcoxon rank-sum tests. The OTUs were aligned and phylogeny was constructed before running the Alpha Diversity tool. Alpha diversity estimates were calculated from a series of rarefaction analyses to assess if sequencing coverage was sufficient. For OTU and functional abundance tables, where abundances are counts, rarefaction was calculated by sub-sampling the abundances in the different samples. The rarefaction curves produced with the Alpha Diversity tool, all reach a plateau, indicating that sequencing was performed to a sufficient level. We controlled for multiple testing with Benjamini-Hochberg false discovery rate (FDR) based upon the p-value of observed differences between treatment groups. Beta diversity estimation was performed to compare microbial community composition between samples and clusters samples based compositional similarity. While the bar chart provides details of the relative abundance of taxa, here grouped by phylum, the PCoA plots show the development of microbiome composition over time. To show whether OTU abundance profiles of replicate samples taken from different animals vary significantly across different animals a Permutational multivariate analysis of variance (PERMANOVA) was performed. Beta diversity was used to observe changes in microbial diversity between mice subjected to different conditions and perform Principal Coordinate Analysis (PCoA) on the distance matrices. The Beta Diversity tool offers three diversity measures (Bray-Curtis, Jaccard and Euclidian) to calculate distance matrices. The results are shown as PCoA plot for the Bray-Curtis distance. To create Heat Map for Abundance Table tool we used the TMM normalization to make samples comparable, then a z-score normalization to make features comparable.

Results

To determine if the observed reduction of alveolar bone destruction associated with *A. muciniphila* treatment (Example 2) was associated with changes in the periodontal and gut microbiome, the composition of the fecal microbiota and biofilm collected around maxillary molars was analyzed in treated and untreated animals.

In the fecal pellets following both treatment regimens, an increase of the relative abundance of *A. muciniphila* was observed (data not show). This increase is indicative of the success of the oral gavage and the persistence of *A. muciniphila* in the intestinal tract during the intervention. Some effects on the relative abundance of other major phyla were observed, the partial replacement of Proteobacteria by Actinobacteria after the *A. muciniphila* administration being the most noticeable (data not shown).

The periodontal microbiota analysis also showed an increased level of *A. muciniphila* upon the different treatments (data not shown). The level of Proteobacteria in gums and teeth samples was markedly increased when compared to the fecal microbiota. While the Firmicutes and *Bacteroides phyla* are present in similar relative abundance in both fecal and gums and teeth samples, their genus and species composition are, as expected, highly different.

Example 4: *A. muciniphila* Induced Anti-Inflammatory Response in Macrophages

Materials and Methods
Material
Mouse Bone Marrow Macrophage

Mice were anaesthetized via isoflurane exposure and euthanized via cervical dislocation. The femurs and tibias were removed from the mice and the bone marrow was flushed from the medullar cavity of the bones with collection media (DMEM, 10% PBS, and 1% penicillin-streptomycin). Cells were cultured in 30% L-929 conditioned RPMI media at a density of $10^5$ cells/mL (Weischenfeldt and Parse, 2008). After one week in culture, cells had differentiated into bone marrow-derived macrophages <I> (BMM<I>). One day prior to experiments, cell culture medium was changed with fresh 30% L-929 conditioned RPMI media. Cultured *P. gingivalis* and/or *A. muciniphila* was added to the BMM<I> cultures at a multiplicity of infection (MOI) of 20 or 40 respectively. BMM<I> were incubated with bacteria for 4 to 24 h. Cells and supernatants were collected at 0, 4, 8 and 24 h.

Methods
TNF-α, IL-6. IL-8 and IL-10 ELISA

Concentrations of cytokines in culture supernatants were measured using eBioscience Mouse tumor necrosis factor α (TNF-α), mouse interleukin 10 (IL-10), mouse interleukin 6 (IL-6), and Human interleukin 8 (IL-8) ELISA Ready-SET-Go!® kits (eBioscience, San Diego, CA, USA) according to manufacturer's instructions.

Results

Figure 4A:
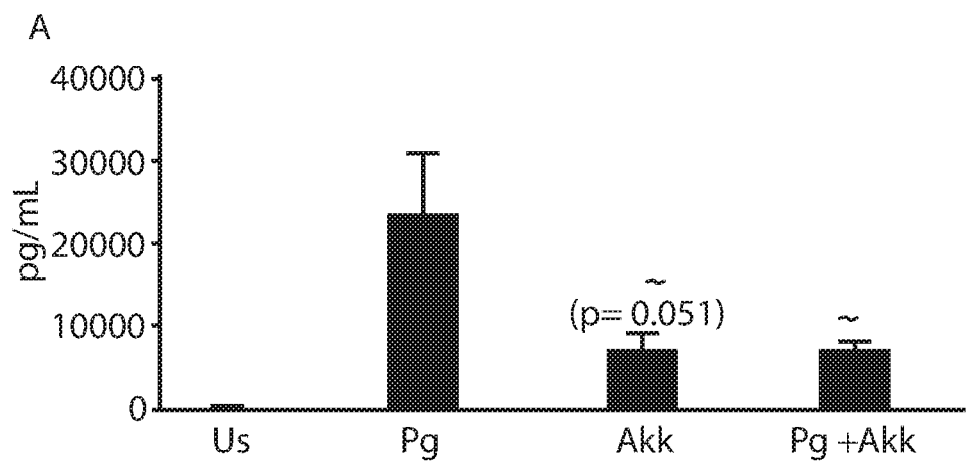
FIG. 4A-B is a series of graph showing interleukine (IL) 6 (IL-6-FIG. 4A) and IL-10 (FIG. 4B) secretion by bone marrow-derived macrophages <I> (BMM<I>) from C57/BL6 mice. BMM<I> were cultured for 8 h without or with (i) 1:20 multiplicity of infection (MOI) of live *P. gingivalis* (Pg), (ii) 1:40 MOI of live *A. muciniphila* (Akk) or (iii) both (Pg+Akk). All values are expressed as mean±SEM (n=8). Data were analyzed via One-way ANOVA or 2-tailed unpaired Student's t test.
Figure 4B:
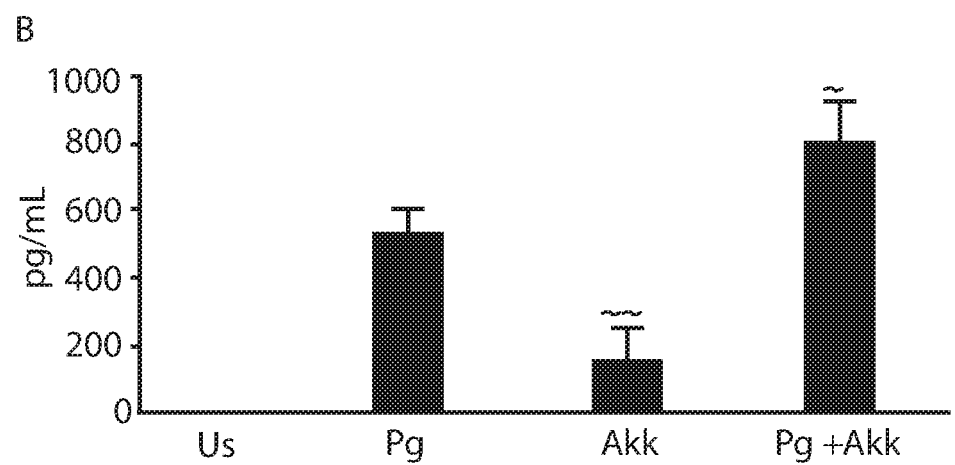
Figure 5A:
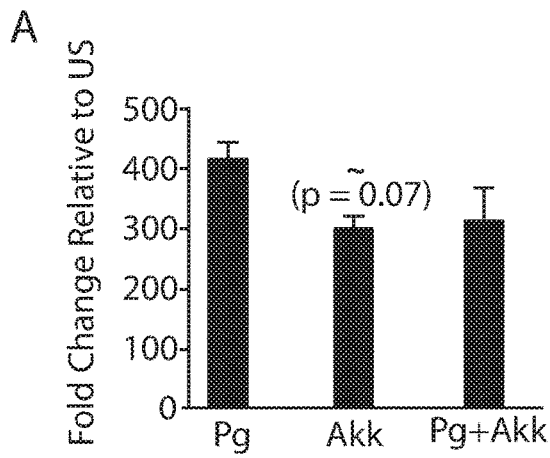
Figure 5B:
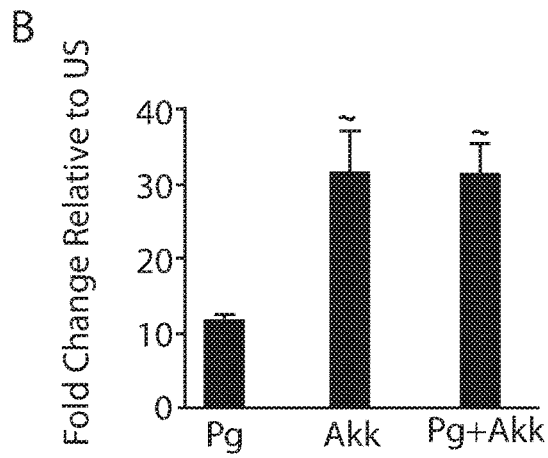
Figure 5C:
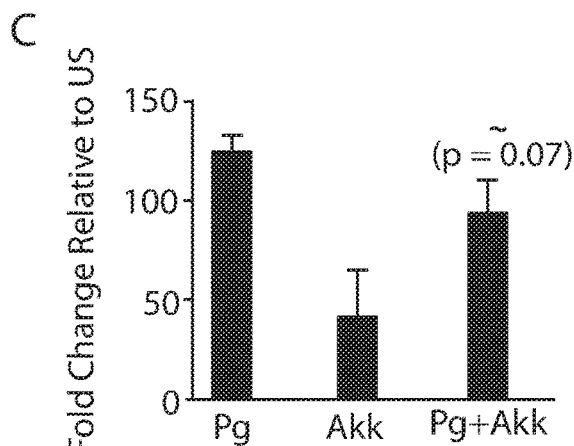
Figure 5D:
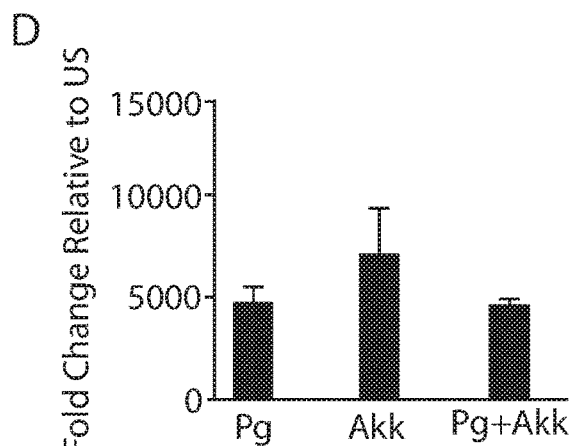
Figure 5E:
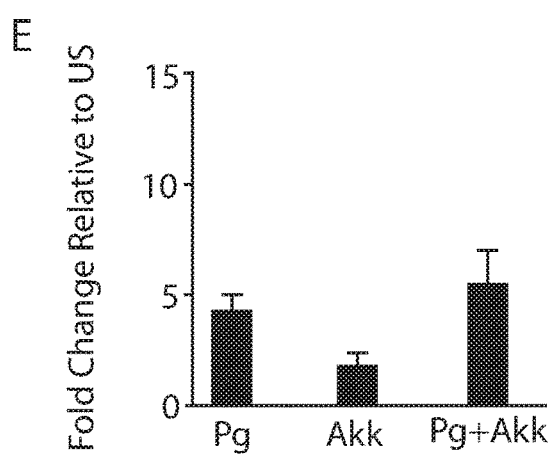
Figure 5F:
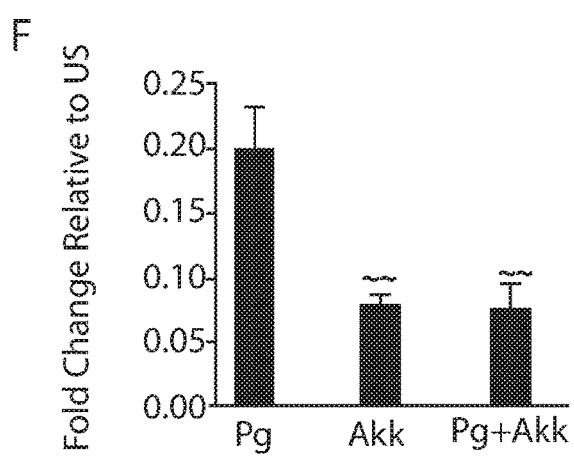

To determine the mechanisms underlying the reduced inflammation and alveolar bone destruction observed in vivo, BMM<I> isolated from lean or obese mice were challenged with *P. gingivalis* and/or *A. muciniphila* for 8 h and supernatants were collected for cytokine analysis (IL-10 and IL-6). Interestingly, exposure to *A. muciniphila* inhibited IL-6 secretion especially in the BMM<I> from *P. gingivalis*-infected mice (FIG. 4, A). In the BMM<I> from mice challenged with *P. gingivalis*, a significant increase of IL-10 secretion was measured (FIG. 4, B). The concurrent exposure to both *P. gingivalis* and *A. muciniphila* induced strong anti-inflammatory effect as IL-10 secretion was significantly increased.

Example 5: *A. muciniphila* Modulates *P. gingivalis*-Elicited BMM<I> Phenotype

Methods
RNA Extraction and Quantitative Real-Time PCR (qRT-PCR)

Total RNA from BMM<I>, Human telomerase immortalized gingival keratinocytes (TIGK) and Human colonic epithelial cells (HT29) cells was isolated and purified with a RNeasy Mini kit according to the manufacturer's instructions (Qiagen, Hilden, DE, USA). cDNA from total RNA was synthesized (50-100 ng RNA/20 µL) using a QuantiTect Reverse transcription kit according to the manufacturer's instructions (Qiagen). qRT-PCR was performed using the Taqman Fast Advanced Master Mix (Applied Biosystems, Foster City, CA, USA) was run for the following genes using primer sets provided by Thermofisher (Table 1). qRT-PCR assays were performed in duplicates on an Applied Biosystems QuantStudio 5 Real-Time PCR system. The data were analyzed using QuantStudio 5 software VI.4. The gene expression levels were normalized to GAPDH for TIGK and HT29 cells or B-actin for BMM<I> samples respectively and expressed relative to unstimulated controls following the 2-CT method {Livak: 2001is}.

TABLE 1

| qRT-PCR primers used | |
|---|---|
| Gene name | Primer's Thermofisher reference # |
| E-cadherin | HS01023895_Ml |
| Integrin-β1 | HS01127536_Ml |
| ZO-1 | Hs01551861_ml |
| Occludin | Hs00170162_ml |
| CCL15 | Hs00361122_ml |
| IL-8 | Hs00174103_ml |
| M1 macrophage markers | |
| TNF-a | Mm00443258_ml |
| IL-15 | Mm00434210_ml |
| IL-15ra | Mm04336046_ml |
| IL-12 | Mm01288989_ml |
| NOS2 | Mm00440502_ml |
| IL-6 | Mm00446190_ml |
| IL-7r | Mm00434295_ml |
| COX2 | Mm03294838_g 1 |
| M2 macrophage markers | |
| IL-10 | Mm99999062_ml |
| SPHKl | Mm00448841_g 1 |
| CCL1 | Mm00441236_ml |
| TLR-1 | Mm00446095_ml |
| Retnla | Mm00445109_ml |
| MRCl | Mm01329362_ml |
| TLR-8 | Mm04209873_ml |
| Argl | Mm00475988_ml |
| VEGF-A | Mm00437306 |
| TGFBl | Mm01178820_ml |

Results

*P. gingivalis* infection increased the mRNA level of TNF-α and interleukin 15ra (IL-15ra), two classical markers associated with a pro-inflammatory M1 BMM<I> phenotype (FIGS. 5, A and B). Hence, periodontal inflammation induced by *P. gingivalis* infection lead to increased M1/M2 ratio. Interestingly, *A. muciniphila* induced a significant increase of IL-15ra (FIG. 5, B). *A. muciniphila* administration increased significantly IL-10 mRNA level in BMM<I> (FIG. 5, C). Interestingly, the expression of markers associated to the BMM<I> subtype of the M2 phenotype were also modulated by *A. muciniphila* administration (FIG. 5, D-F). These results emphasized the ability of *A. muciniphila* to drive the inflammatory response towards a pro-resolution BMM<I> profile contributing to the control of the pro-inflammatory response elicited by *P. gingivalis* mainly through promotion of pro-resolving M2 phenotype.

Example 6: *A. muciniphila* Resolved *P. gingivalis*-Induced Cytokine Paralysis in Gingival and Colonic Epithelial Cells and Improved the Expression of Tight Junction and Cell-Cell Adhesion Markers Material and Methods
Material
Gingival Keratinocyte Culture Human telomerase immortalized gingival keratinocytes (TIGK) derived from gingival epithelium were maintained at 37° C. and 5% CO2 in DermaLife K Serum-Free Keratinocyte Culture Medium (Fisher Scientific, Suwanee, GA, USA) as described previously (Moffatt-Jauregui et al., 2013). TIGKs were seeded into 6-well plates at a concentration of $3-5\times10^5$ cells/well. One day prior to experiments, cell culture medium was changed for fresh DermaLife K Serum-Free Keratinocyte Culture Medium lacking antibiotics. TIGKs were incubated with bacteria (*P. gingivalis* or *A. muciniphila*) for 4 to 24 h. Supernatants were collected for further studies after each incubation time and cells were isolated at the end point of each experiment.
Colonic Cell Culture Human colonic epithelial cells (HT29-ATCC® HTB-38™) were purchased from American Type Culture Collection (ATCC, Manassas, VA, USA). The cells were maintained at 37° C. and 5% CO2 in McCoy's Sa medium supplemented with 10% fetal bovine serum according to the manufacturer's instructions. HT29 cells were seeded into 6-well plates at a concentration of $3-5\times10^5$ cells/well. One day prior to experiments, cell culture medium was replenished with fresh media and incubated with *P. gingivalis* or *A. muciniphila* for 4 or 24 hours. Supernatants were collected for further studies after each incubation time, and cells were isolated at the end point of each experiment.
Methods Same as in Example 5.
Results Epithelial cells are key cells in the maintenance of periodontal homeostasis. Due to their specific localization at the interface with oral biofilms, they have a key role in the innate immune response and could be considered as the first line of host defense. The same role has been described for epithelial cells in gut. *A. muciniphila* has been described to be associated to a healthy gut and its administration in diet-induced obese mice induces a systemic anti-inflammatory effect and improved epithelial barrier integrity through an increased expression of tight junction proteins {Schneeberger: 2015fs} {Plovier: 2017dp} {Li: 2016bc}. As gingival epithelial cells display specific phenotype and characteristics, the evaluation of their in vitro response to *A. muciniphila* has been studied. In both epithelial cells of gingival or colonic origin (TIGK and HT29), administration of *A. muciniphila* increased IL-8 secretion suggesting an enhanced anti-infective response through recruitment of host-defense cells such as polymorphonuclear cells (FIGS. 6, A and E and FIGS. 7, A and E). As observed in colonic cells, *A. muciniphila* induced mRNA expression of both cell-cell adhesion molecules (Integrin-B1 and E-cadherin—FIGS. 6, B and C and FIGS. 7, B and C) as well as tight junction molecules (Occludin and zonula occludens 1-Z0-1) in gingival epithelial cells infected with *P. gingivalis* (FIGS. 6, E and F and FIGS. 7, E and F).

Example 7: Ligature Induced *P. gingivalis* Aggravated Periodontal Model and Therapeutic Agent Administration Procedure Four days prior to the start of ligature placement all mice were administered antibiotics (Sulfa methoxazole 200 mg/5 mL+trimethoprim 40 mg/5 mL) via drinking water. After three days of antibiotics, water without antibiotics was given to the mice and ligature placements started the following day. Sterile black braided 6-0 silk sutures were incubated in *P. gingivalis* culture for 1 day in anaerobic conditions. Following anesthesia, *P. gingivalis* infected 6-0 ligatures were placed in the sulcus around the maxillary first and second molars as previously described (Saadi-Thiers et al., 2013). Ligatures were replaced 3 times/week during 3 weeks with fresh *P. gingivalis* soaked ligatures. On days in between ligature placement, oral gavage with *P. gingivalis* ($2.5\times10^8$ CPU) was provided as previously described (Alshammari et al., 2017). After 3 weeks of periodontitis induction the mice were spilt into groups of six for therapeutic inoculation of the following by oral gavage: *A. muciniphila* ($4\times10^8$ CPU), Heat killed *A. muciniphila* ($4\times10^8$ CPU), or pili-like protein Amuc_1 100 (6 ug/mouse) concomitantly with *P. gingivalis* five times a week for an additional three weeks. In addition, two groups received *A. muciniphila* ($4\times10^8$ CPU), and Heat killed *A. muciniphila* ($4\times10^8$ CPU) as a gastric gavage. Mice receiving oral gavage of *P. gingivalis* ($2.5\times10^8$ CPU) were used as a positive control.
Morphometric Analysis At the end point of ligature placement mice were sacrificed and the palatal bone was excised. After mechanical de-fleshing for 15 min in boiling water, the samples were washed in PBS and exposed overnight in 3% hydrogen peroxide. The palatal bones were treated with 10% bleach for 1 min, washed with PBS 3 times for 5 min and then dried at 37° C. Bone staining was performed at room temperature with 1% methylene blue (Sigma-Aldrich) for 1 min, after which specimens were washed and dried 30 min at 37° C. (Alshammari et al., 2017). Bone loss was defined as the distance between cementa-enamel junction (CEJ) and the most coronal alveolar bone. Measurements were taken at 6 sites from the mesial aspect of the first molar to the distal aspect of second molar. Bone loss was expressed as a mean+/−SEM in µm.
Bone Marrow Macrophage Cultures Bone marrow macrophages (BMM) were harvested as described previously (Zhang, Goncalves, & Mosser, 2008). Briefly, bone marrow cells from the femurs and tibias of donor mice were isolated and cultured in 30% L-929 conditioned RPMI media. After one week in culture the isolated monocytes had differentiated into macrophages. One day prior to the experiments cell culture medium was changed with fresh 30% L-929 conditioned RPMI media. Cultured *P. gingivalis* was added to cultures at a multiplicity of infection (MOI) of 20:1. Pili-like protein Amuc_1 100 was added to cultures at two concentrations (1 µg/mL or 10 µg/mL) either alone (Amuc), 4-hours before *P. gingivalis* infection (Amuc+Pg), 4-hours after *P. gingivalis* infection (Pg+

Amuc), or simultaneous to the addition of *P. gingivalis* (Amuc/Pg). BMM were incubated with bacteria for 8-hours in total and at the end point supernatants were collected for analysis via ELISA.

Results

We have demonstrated that in lean mice oral administration of live *A. muciniphila* but not heat killed *A. muciniphila* can reduce the alveolar bone resorption associated with *P. gingivalis* induced disease. Interestingly, the administration of pili-like protein Amuc_1 100 also reduced bone resorption induced by *P. gingivalis* administration demonstrating the ability of the protein alone to modulate the host response to bacterial challenge. This has further been supported in in vitro studies of BMM where we demonstrated the ability of Amuc_1 100 to reduce TNFa production while increasing IL10 levels in the context of *P. gingivalis* infection. See FIG. 8.

Similarly in obese mice oral administration of pili-like protein Amuc_1 100, live *A. muciniphila* can reduce the alveolar bone resorption associated with *P. gingivalis* induced disease. In contrast to lean mice, obese mice that received a gastric administration of heat killed *A. muciniphila* demonstrated a reduction in alveolar bone resorption. Similar results were observed in obese mice administered live *A. muciniphila* via gastric gavage. See FIG. 9. The reduction of bone loss by gastric administration of live or heat killed *A. muciniphila* was not observed in lean mice. This data suggests that in obese animals the gastric administration may modulate the dysbiotic gastric microbiome of these mice allowing for a reduction in systemic inflammation, in turn reducing the bone loss associated with *P. gingivalis* induced disease.

All together this data in combination with our pervious findings supports the use of *A. muciniphila* as a novel probiotic for use in periodontal disease. Furthermore, it demonstrates the beneficial role of pili-like protein Amuc_1100 in *A. muciniphila* administration in our disease models.

What is claimed:

1. A method for treatment, or prevention of periodontal disease associated with *P. gingivalis* induced soft-tissue inflammation, bone destruction and/or altered cytokine response in a subject in need thereof; comprising administration to the subject a composition comprising *Akkermansia* wherein said composition is formulated for topical administration within the oral cavity for use in the treatment, or prevention, of the periodontal diseases.

2. The method of claim 1, wherein the *Akkermansia* comprises *Akkermansia muciniphila* or *Akkermansia glycaniphilus* or variants thereof.

3. The method of claim 1, wherein said *Akkermansia* is alive.

4. The method of claim 1, wherein said *Akkermansia* is pasteurized at a temperature ranging from 50° to 100° for at least about 10 minutes.

5. The method of claim 1, wherein the *Akkermansia* is administered in the form of a toothpaste, mouthwash, mouth rinse or dental gel.

6. A method for treatment, or prevention of periodontal disease associated with *P. gingivalis* induced soft-tissue inflammation, bone destruction and/or altered cytokine response in a subject in need thereof; comprising administering to the subject a composition comprising an *Akkermansia* fragment wherein said composition is formulated for topical administration within the oral cavity for use in the treatment or prevention of said periodontal disease and wherein said fragment of *Akkermansia* comprises:
  (i) an Amuc_1100 amino acid sequence of SEQ ID NO: 1 or SEQ ID NO: 2; or
  (ii) an amino acid sequence with at least 98% identity with the Amuc_1100 amino acid sequence of SEQ ID NO: 1 or SEQ ID NO: 2.

7. The method of claim 6, wherein said fragments are administered in the form of a toothpaste, mouthwash, mouth rinse or dental gel.

SEQUENCE LISTING

```
Sequence total quantity: 2
SEQ ID NO: 1          moltype = AA  length = 286
FEATURE               Location/Qualifiers
REGION                1..286
                      note = Synthetic
source                1..286
                      mol_type = protein
                      organism = synthetic construct
SEQUENCE: 1
IVNSKRSELD KKISIAAKEI KSANAAEITP SRSSNEELEK ELNRYAKAVG SLETAYKPFL   60
ASSALVPTTP TAFQNELKTF RDSLISSCKK KNILITDTSS WLGFQVYSTQ APSVQAASTL  120
GFELKAINSL VNKLAECGLS KFIKVYRPQL PIETPANNPE ESDEADQAPW TPMPLEIAFQ  180
GDRESVLKAM NAITGMQDYL FTVNSIRIRN ERMMPPPIAN PAAAKPAAAQ PATGAASLTP  240
ADEAAAPAAP AIQQVIKPYM GKEQVFVQVS LNLVHFNQPK AQEPSE                286

SEQ ID NO: 2          moltype = AA  length = 316
FEATURE               Location/Qualifiers
REGION                1..316
                      note = Synthetic
source                1..316
                      mol_type = protein
                      organism = synthetic construct
SEQUENCE: 2
MSNWITDNKP AAMVAGVGLL LFLGLSATGY IVNSKRSELD KKISIAAKEI KSANAAEITP   60
SRSSNEELEK ELNRYAKAVG SLETAYKPFL ASSALVPTTP TAFQNELKTF RDSLISSCKK  120
KNILITDTSS WLGFQVYSTQ APSVQAASTL GFELKAINSL VNKLAECGLS KFIKVYRPQL  180
PIETPANNPE ESDEADQAPW TPMPLEIAFQ GDRESVLKAM NAITGMQDYL FTVNSIRIRN  240
ERMMPPPIAN PAAAKPAAAQ PATGAASLTP ADEAAAPAAP AIQQVIKPYM GKEQVFVQVS  300
LNLVHFNQPK AQEPSE                                                 316
```

8. The method of claim 1, wherein the amount of *Akkermansia* administered per day ranges from about $10^2$ to $10^{15}$ cfu/day.

9. A method for treatment, or prevention of periodontal disease associated with *P. gingivalis* induced soft-tissue inflammation, bone destruction and/or altered cytokine response in a subject in need thereof; comprising administration to the subject a composition comprising *Akkermansia* derived extracellular vesicles wherein said composition is formulated for topical administration within the oral cavity for use in the treatment of said oral diseases.

10. The method of claim 9, wherein said *Akkermansia* derived extracellular vesicles are administered in the form of a toothpaste, mouthwash, mouth rinse or dental gel.

* * * * *